United States Patent
Ma et al.

(10) Patent No.: US 10,156,733 B2
(45) Date of Patent: Dec. 18, 2018

(54) LENS DEVICE

(71) Applicant: INDUSTRIAL TECHNOLOGY RESEARCH INSTITUTE, Hsinchu (TW)

(72) Inventors: Shou-Cheng Ma, Taichung (TW); Cheng-Hsuan Lin, Taoyuan (TW); Wen-Yang Peng, Hsinchu County (TW); Chieh-Yi Huang, Hsinchu County (TW); Chau-Shin Jang, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 98 days.

(21) Appl. No.: 15/388,946

(22) Filed: Dec. 22, 2016

(65) Prior Publication Data

US 2018/0157059 A1 Jun. 7, 2018

(30) Foreign Application Priority Data

Dec. 5, 2016 (TW) .............................. 105140143 A

(51) Int. Cl.
*G02B 27/64* (2006.01)
*G02B 7/09* (2006.01)
(Continued)

(52) U.S. Cl.
CPC ............. *G02B 27/646* (2013.01); *G02B 7/08* (2013.01); *H02K 41/0356* (2013.01)

(58) Field of Classification Search
None
See application file for complete search history.

(56) References Cited

U.S. PATENT DOCUMENTS 8,670,195 B2 3/2014 Ikushima et al.
2009/0252488 A1 10/2009 Eromaki et al.
(Continued)

FOREIGN PATENT DOCUMENTS

CN 2757155 Y 2/2006
CN 105099119 A 11/2015
(Continued)

OTHER PUBLICATIONS

"A Study of Mobile Optical Image Stabilization System for Mobile Camera", B. Cardani, IEEE International Conference on Consumer Electronics, 2014/0, p. 4558-4561, 2012.
(Continued)

*Primary Examiner* — William B Perkey
(74) *Attorney, Agent, or Firm* — Maschoff Brennan

(57) ABSTRACT

A lens device comprises a connect assembly, a lens assembly and a drive assembly. The lens assembly is disposed on the connect assembly and has a central axis. The drive assembly comprises a first coil, a magnet and a second coil. The first coil is wound around the lens assembly. The magnet is disposed on the connect assembly and has a first magnetic pole, a second magnetic pole, a first direction of magnetic field and a second direction of magnetic field. The first direction of magnetic field and the second direction of magnetic field are not parallel to each other. The first direction of magnetic field points toward the first coil. The second coil is disposed on the connect assembly. The second direction of magnetic field points toward a part of the second coil.

28 Claims, 27 Drawing Sheets

(51) Int. Cl.
*G02B 7/08* (2006.01)
*H02K 41/035* (2006.01)

(56) References Cited

U.S. PATENT DOCUMENTS

| | | | |
|---|---|---|---|
| 2011/0176046 A1* | 7/2011 | Hu | G02B 7/08 348/335 |
| 2013/0016427 A1* | 1/2013 | Sugawara | G02B 7/08 359/557 |
| 2014/0009631 A1 | 1/2014 | Topliss | |
| 2014/0333784 A1 | 11/2014 | Hu et al. | |
| 2014/0355118 A1* | 12/2014 | Park | G02B 27/646 359/557 |
| 2014/0368914 A1* | 12/2014 | Hu | G02B 27/646 359/557 |
| 2015/0022891 A1* | 1/2015 | Hu | G02B 7/08 359/557 |
| 2015/0350507 A1* | 12/2015 | Topliss | H04N 5/2254 348/208.2 |
| 2016/0054578 A1* | 2/2016 | Dong | G02B 27/646 359/557 |
| 2016/0255276 A1* | 9/2016 | Sekimoto | G02B 7/02 29/428 |
| 2017/0045707 A1* | 2/2017 | Terajima | G02B 7/09 |
| 2017/0118408 A1* | 4/2017 | Gregory | H04N 5/23287 |
| 2017/0160558 A1* | 6/2017 | Kim | G02B 27/646 |
| 2017/0371127 A1* | 12/2017 | Murakami | H04N 5/23264 |
| 2018/0003918 A1* | 1/2018 | Hu | G02B 7/023 |
| 2018/0004005 A1* | 1/2018 | Hu | H04N 5/23248 |

FOREIGN PATENT DOCUMENTS

| | | |
|---|---|---|
| TW | 201129822 A | 9/2011 |
| TW | M515654 U | 1/2016 |
| TW | M516172 | 1/2016 |
| WO | 2016/006780 A1 | 1/2016 |

OTHER PUBLICATIONS

"Design of a Voice-Coil Actuator for Optical Image Stabilization Based on Genetic Algorithm", Myeong-Gyu Song, Young-Jun Hur, No-Cheol Park, Kyoung-Su Park, Young-Pil Park, Soo-Cheol Lim, and Jae-Hyuk Park, IEEE Transactions on Magnetics, Oct. 2009, p. 4558-4561, 2009.

"Development of Small Sized Actuator with Compliant Mechanism for Optical Image Stabilization", Myeong-Gyu Song; Hyun-Woo Baek; No-Cheol Park; Kyoung-Su Park; Taeyong Yoon; Young-Pil Park; Soo-Cheol Lim,IEEE Transactions on Magnetics, Jun. 2010, p. 2369-2372, 2010.

"Optical Image Stabilization for Digital Cameras" B. Cardani, IEEE Control Systems, Apr. 2006, p. 21-22, Apr. 2006.

"Optimal Design of a Ferromagnetic Yoke for Reducing Crosstalk in Optical Image Stabilization Actuators", Jung-Hyun Woo; Jun-Ho Yoon; Young Jun Hur; No-Cheol Park; Young-Pil Park; Kyoung-Su Park, IEEE Transactions on Magnetics, Oct. 2011, p. 4298-4301, 2011.

"Sliding Mode Control Using Virtual Eigenvalue Method for Compact Optical Image Stabilization Actuators", Hsing-Cheng Yu; T. S. Liu, IEEE Transactions on Magnetics, Nov. 2008, p. 4074-4077, Nov. 2008.

TW Office Action dated Jun. 6, 2017 as received in Application No. 105140143.

* cited by examiner

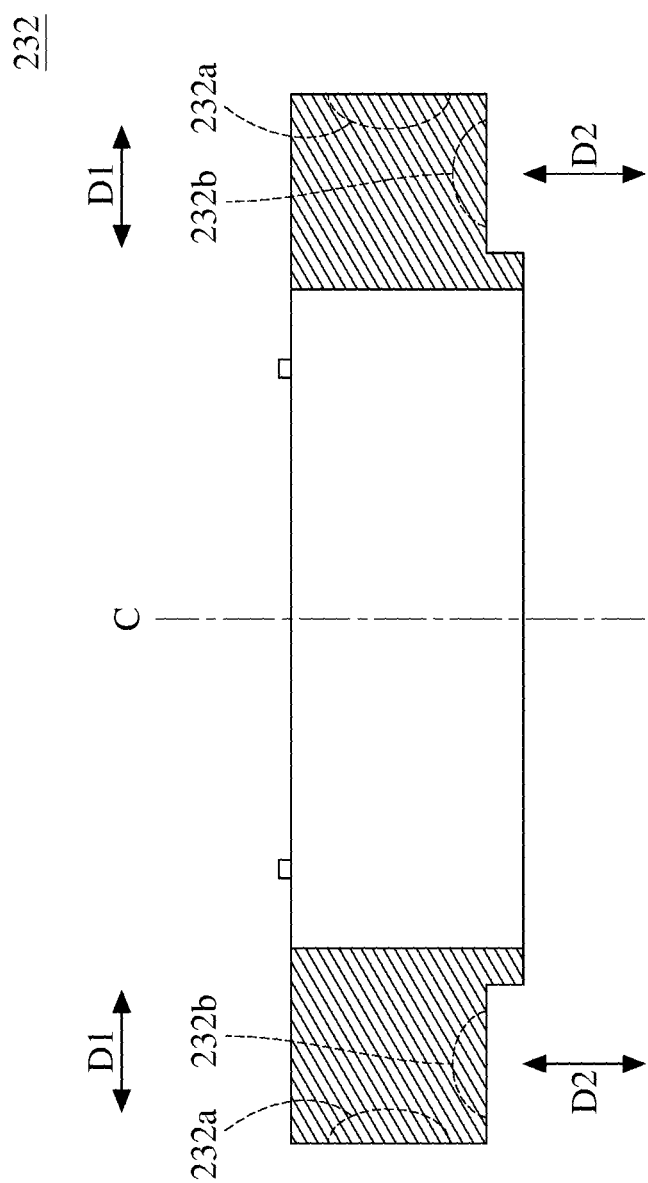

LENS DEVICE

CROSS-REFERENCE TO RELATED APPLICATIONS

This non-provisional application claims priority under 35 U.S.C. § 119(a) on Patent Application No(s). 105140143 filed in Taiwan, R.O.C. on Dec. 5, 2016, the entire contents of which are hereby incorporated by reference.

TECHNICAL FIELD

The disclosure relates to a lens device, more particularly to a lens device having a lens assembly driven by magnetic force.

BACKGROUND

In photography field, a lens device is used to capture light from an object and bring it to a focus on an image sensor in a camera. In conventional cameras, the lens device has a motor, a gear unit, lenses and a rail. The lenses can be moved along the rail by being driven by the motor and the gear unit in order to bring light to a focus on the image sensor. However, the motor, the gear unit and the rail are large and heavy.

In recent years, portable electronic devices, such as smart phones, are equipped with a camera module. If the aforementioned lens device is equipped in the portable electronic device, the portable electronic will be not good in portability. In order to reduce the weight of the lens device, some manufacturers remove the motor, the gear unit and the rail to create an unadjustable lens device. However, the unadjustable lens device only can bring light from an object far away from the electronic device to a focus on the image sensor, so it can not focus clearly on objects that are near. In addition, when taking photos, users may get blurry photos due to camera shake.

SUMMARY

The present disclosure provides a lens device which is small in size, light in weight, and able to move a lens assembly for adjusting focus and reducing camera shake or vibration.

One embodiment of the disclosure provides a lens device comprises a connect assembly, a lens assembly and a drive assembly. The lens assembly is disposed on the connect assembly and has a central axis. The drive assembly comprises a first coil, at least one magnet and at least one second coil. The first coil is wound around the lens assembly. The at least one magnet is disposed on the connect assembly and has a first magnetic pole, a second magnetic pole, a first direction of magnetic field and a second direction of magnetic field. The first direction of magnetic field is taken to be inward to/outward from the first magnetic pole. The second direction of magnetic field is taken to be inward to/outward from the second magnetic pole. The first direction of magnetic field and the second direction of magnetic field are not parallel to each other. The first direction of magnetic field points toward the first coil or points away from the first coil. The first coil is configured for driving the lens assembly to move substantially along the central axis by interacting with the first magnetic pole. The at least one second coil is disposed on the connect assembly. The second direction of magnetic field points toward a part of the at least one second coil or points away from the part of the at least one second coil. The at least one second coil is configured for driving the lens assembly, the at least one magnet and the first coil to move along a direction other than the central axis by interacting with the second magnetic pole.

One embodiment of the disclosure provides a lens device comprises a connect assembly, a lens assembly and a drive assembly. The lens assembly is disposed on the connect assembly and has a central axis. The drive assembly comprises at least one first magnet, a first coil, at least one second magnet and at least one second coil. The at least one first magnet is disposed on the lens assembly and has a first magnetic pole, a first direction of magnetic field. The first direction of magnetic field is taken to be inward to/outward from the first magnetic pole. The first coil is disposed on the connect assembly. The at least one first magnet is located between the first coil and the lens assembly. The first direction of magnetic field points toward the first coil or points away from the first coil. The first coil is configured for driving the lens assembly and the at least one first magnet to move substantially along the central axis by interacting with the first magnetic pole. The at least one second magnet is disposed on the lens assembly or the first coil. The at least one second magnet has a second magnetic pole and a second direction of magnetic field. The second direction of magnetic field is taken to be inward to/outward from the second magnetic pole. The first direction of magnetic field and the second direction of magnetic field are not parallel to each other. The at least one second coil is disposed on the connect assembly. The second direction of magnetic field points toward the at least one second coil or points away from the at least one second coil. The at least one second coil is configured for driving the lens assembly, the at least one first magnet and the at least one second magnet to move along a direction other than the central axis by interacting with the second magnetic pole.

One embodiment of the disclosure provides a lens device comprises a connect assembly, a lens assembly and a drive assembly. The lens assembly is disposed on the connect assembly and has a central axis. The drive assembly comprises a first coil, a magnet and at least one second coil. The first coil is wound around the lens assembly. The magnet is disposed on the connect assembly and hays a first magnetic pole, a second magnetic pole, a first direction of magnetic field and a second direction of magnetic field. The magnet is in a circle shape and has an inner surface and an outer surface. Either the first magnetic pole or the second magnetic pole is located at the inner surface when the other one is located at the outer surface. The first direction of magnetic field is taken to be inward to/outward from the first magnetic pole, and the second direction of magnetic field is taken to be inward to/outward from the second magnetic pole. The first direction of magnetic field and the second direction of magnetic field are substantially the same. The first direction of magnetic field points toward the first coil or points away from the first coil. The first coil is configured for driving the lens assembly to move substantially along the central axis by interacting with the first magnetic pole. The at least one second coil is disposed on the connect assembly. One side of the magnet surfaces but the inner surface or the outer surface of the magnet faces toward the at least one second coil. The at least one second coil is configured for driving the lens assembly, the magnet and the first coil to move along a direction other than the central axis by interacting with the second magnetic pole.

According to the lens device as discussed above, by the interaction between the electric current of the first coil and the magnetic field of the first magnetic pole, the lens device is able to produce a magnetic force to drive the lens assembly to move substantially along its central axis, thereby bringing light to a focus on the image sensor. Therefore, there is no need to equip motor, gear unit and rail in the lens device of the present disclosure, so that the lens device of the present disclosure is small in size and light in weight, and is capable of adjusting focus. Also, by the interaction between the electric current of the second coil and the magnetic field of the second magnetic pole, the lens device is able to produce a magnetic force to drive the lens assembly to move substantially along a direction other than its central axis, thereby moving the lens assembly to compensate for camera shake or vibration. Thus, the camera shake or vibration is reduced.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein:

FIG. 6B is a cross-sectional view of a magnet of the lens device in FIG. 6A;

DETAILED DESCRIPTION

Figure 1:
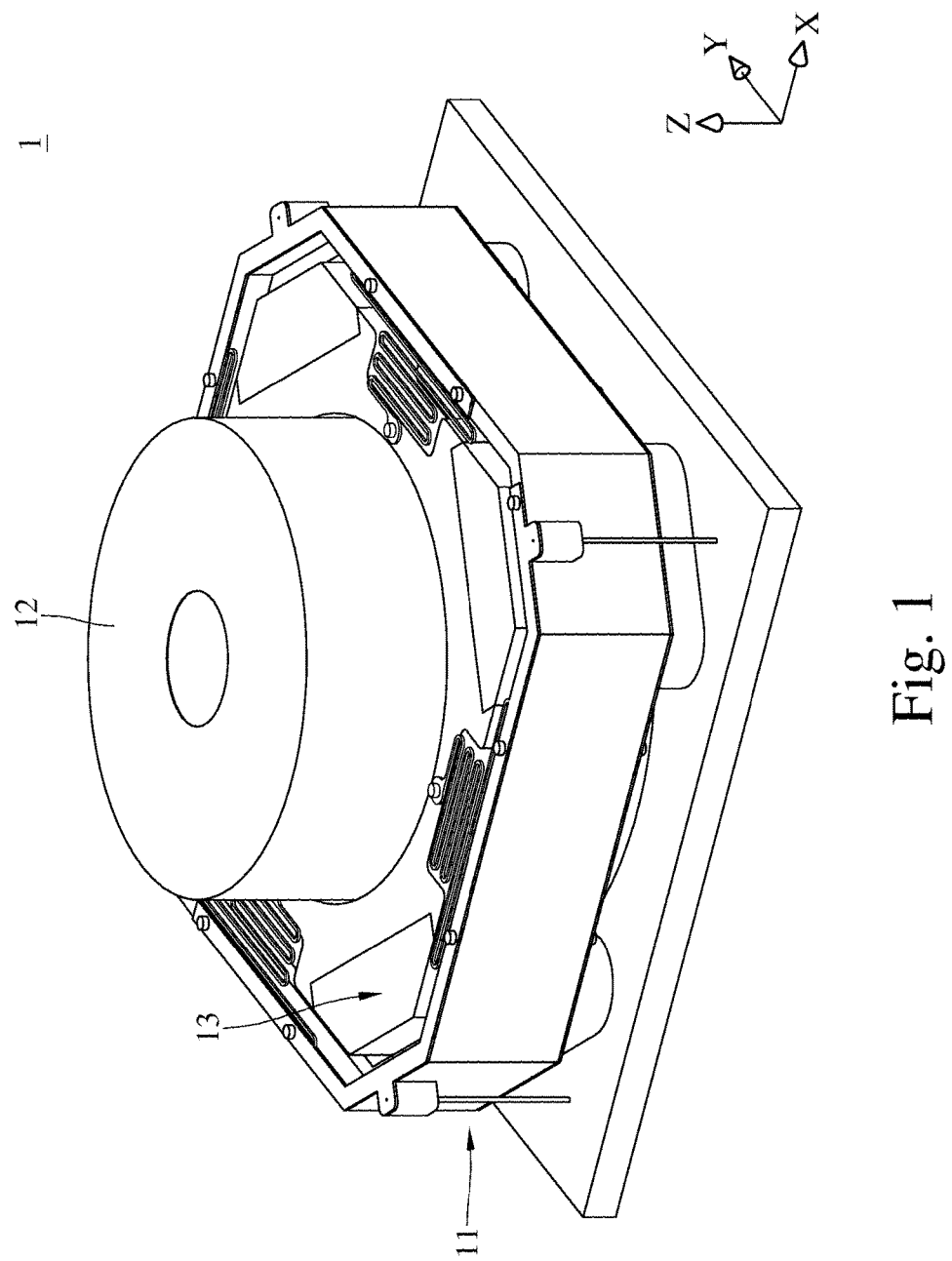
FIG. 1 is a perspective view of a lens device in accordance with one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The drawings may not be drawn to actual size or scale, some exaggerations may be necessary in order to emphasize basic structural relationships, while some are simplified for clarity of understanding, and the present disclosure is not limited thereto. It is allowed to have various adjustments under the spirit of the present disclosure. In the specification, the term "on" may be described as "one is located above another" or "one is in contact with another". In addition, the terms "top side", "bottom side", "above" and "below" are used to illustrate but limit the present disclosure. The term "substantially" is referred to the complete or nearly complete extent or degree of a structure, which means that it is allowable to have tolerance during manufacturing.

Figure 2:
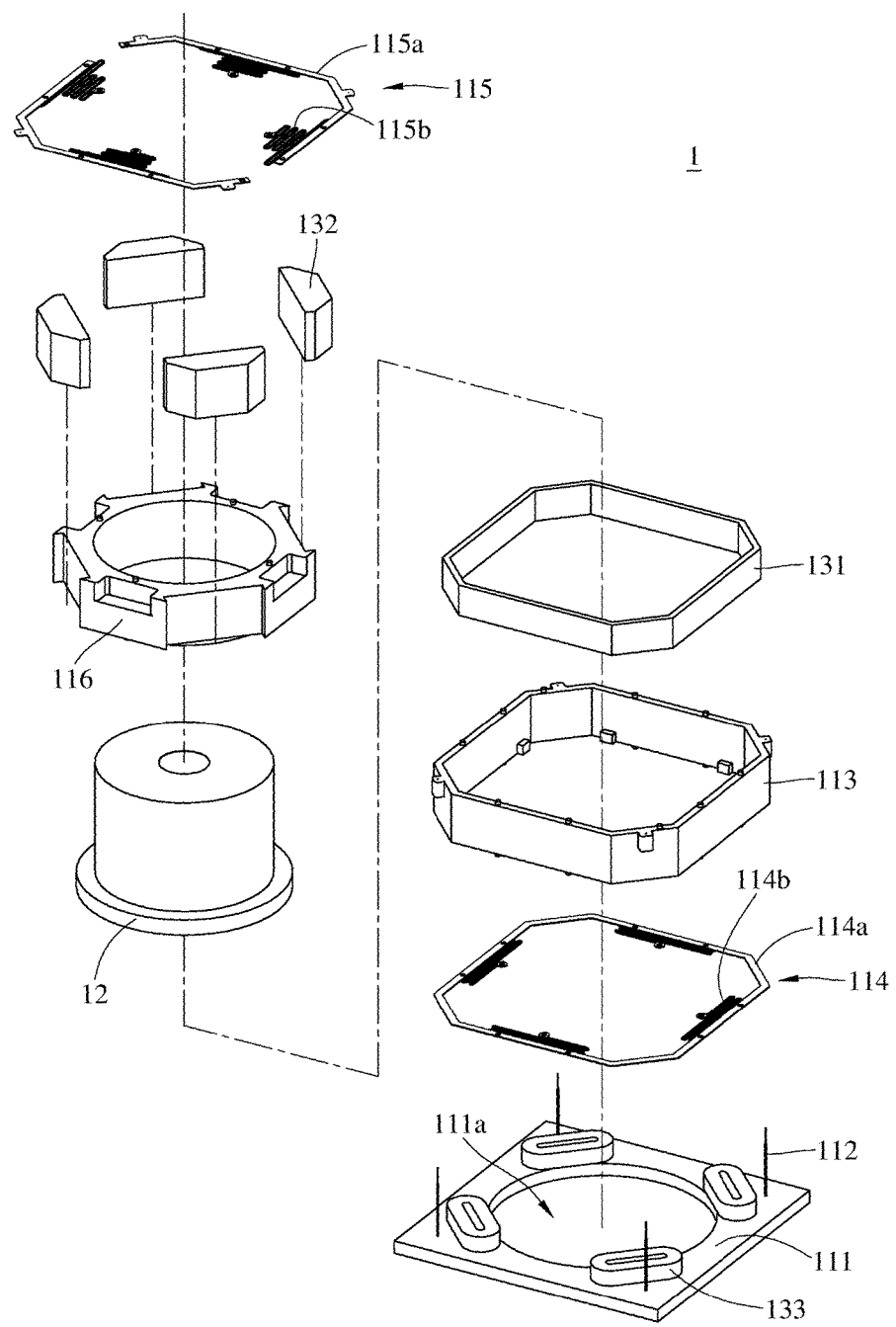
FIG. 2 is an exploded view of the lens device in FIG. 1.

Please refer to FIG. 1 to FIG. 2. FIG. 1 is a perspective view of a lens device in accordance with one embodiment of the disclosure, and FIG. 2 is an exploded view of the lens device in FIG. 1. As shown in FIG. 1 to FIG. 2, a lens device 1 is provided. The lens device 1 includes a connect assembly 11, a lens assembly 12 and a drive assembly 13. The connect assembly 11 includes a base plate 111, a plurality of flexible supports 112, a frame 113, a first flexible connection 114, two second flexible connections 115 and a lens seat 116. The drive assembly 13 includes a first coil 131, a plurality of magnets 132 and a plurality of second coils 133.

Figure 3:
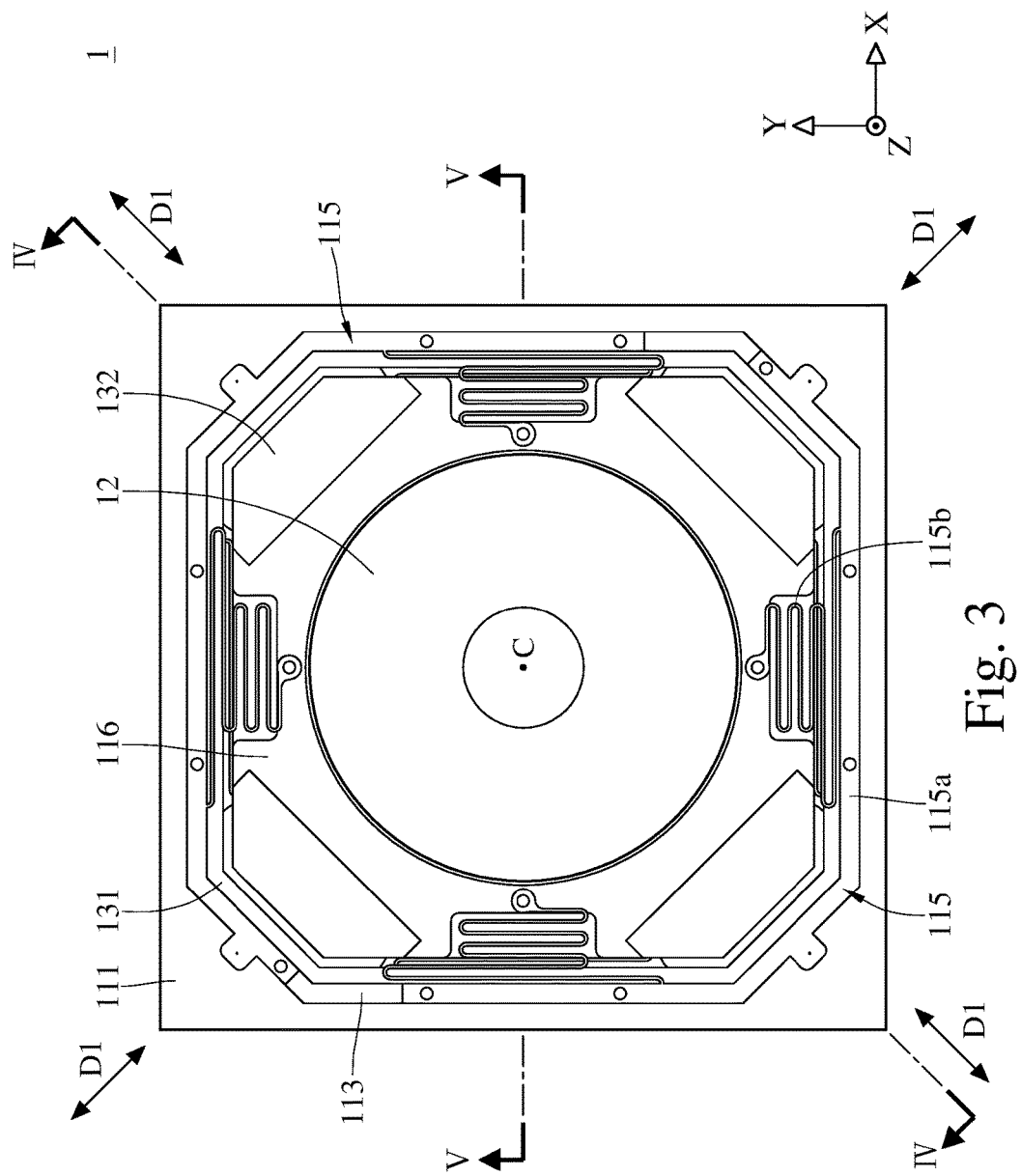
FIG. 3 is a top view of the lens device in FIG. 1.
Figure 4:
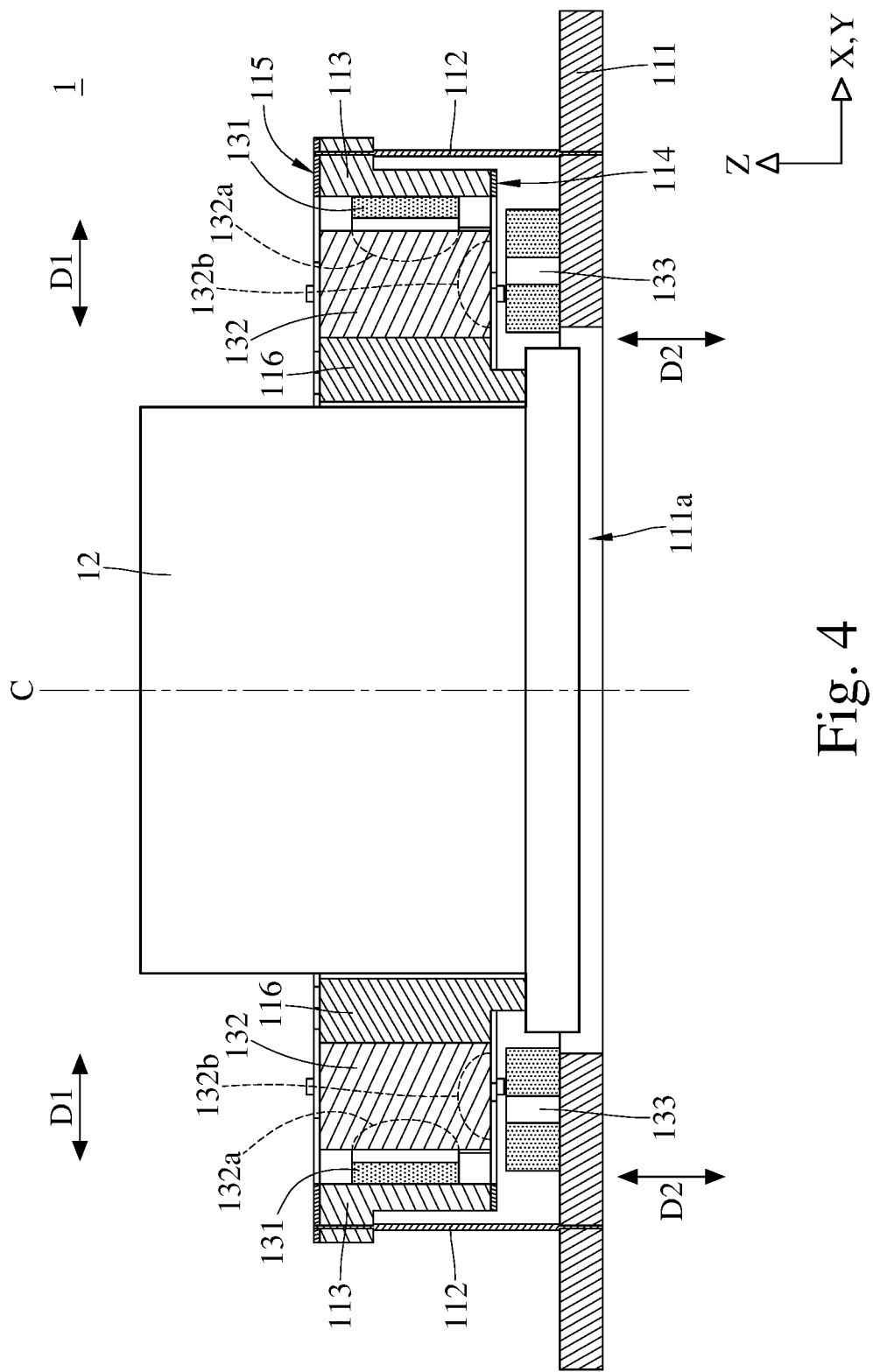
FIG. 4 is a cross-sectional view of the lens device in FIG. 3 taken along line IV-IV.
Figure 5:
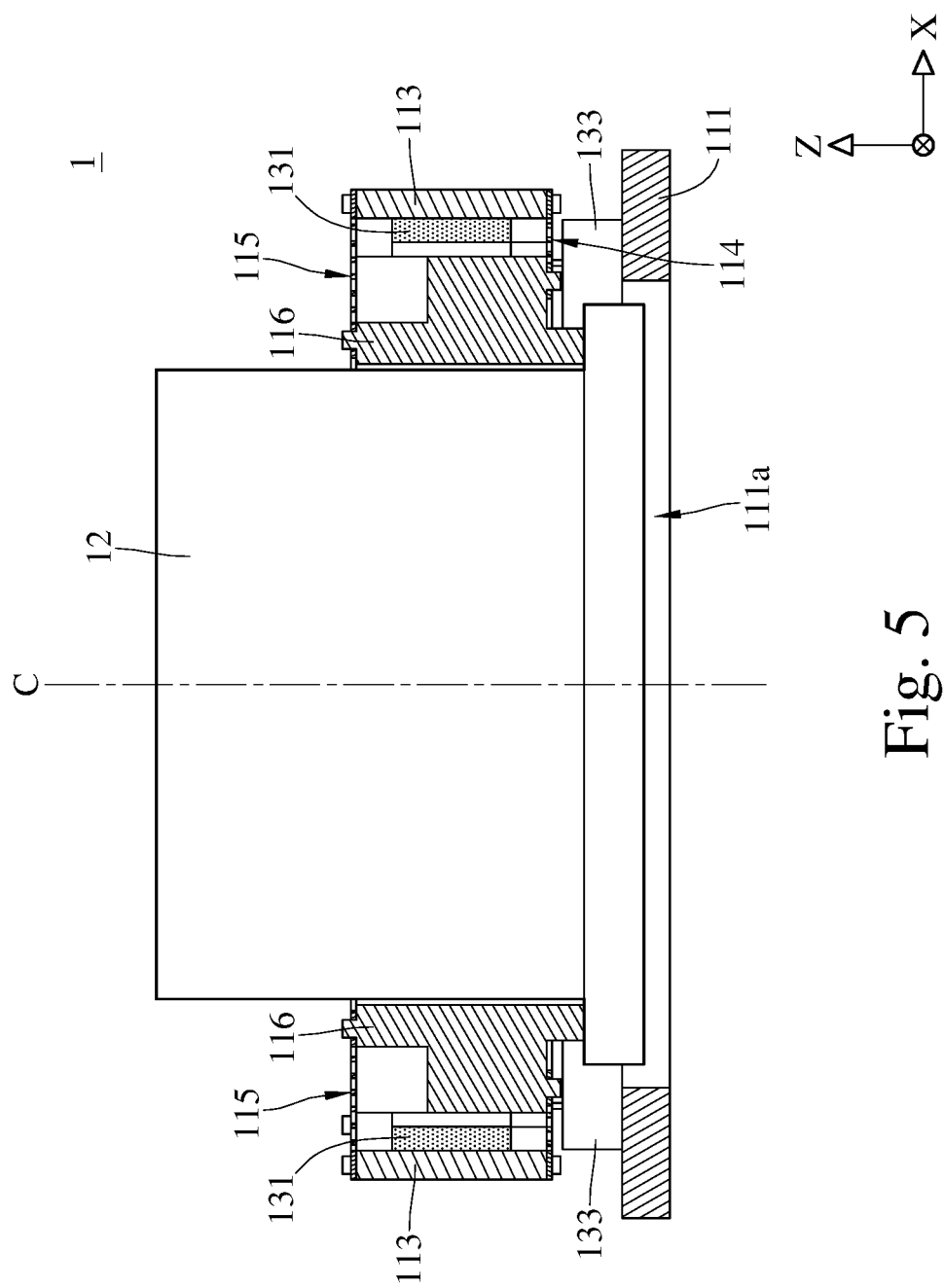
FIG. 5 is a front cross-sectional view of the lens device in FIG. 3 taken along line V-V.

Please refer to FIG. 2 to FIG. 5. FIG. 3 is a top view of the lens device in FIG. 1, FIG. 4 is a cross-sectional view of the lens device in FIG. 3 taken along line IV-IV, and FIG. 5 is a front cross-sectional view of the lens device in FIG. 3 taken along line V-V. The lens assembly 12 has a central axis C. The lens assembly 12 and the magnets 132 are disposed on the lens seat 116 of the connect assembly 11. The lens assembly 12 and the magnets 132 are connected by the lens seat 116. The lens seat 116 surrounds the lens assembly 12. The magnets 132 surround the lens assembly 12. In other words, the magnets 132 are disposed on the lens assembly 12 through the lens seat 116. Each magnet 132 has a first magnetic pole 132a and a second magnetic pole 132b. The first magnetic pole 132a and the second magnetic pole 132b are respectively located at two surfaces of the magnet 132, which are adjacent to each other. The first magnetic pole 132a faces away from the lens assembly 12.

Each magnet 132 has a first direction of magnetic field D1 taken to be inward to/outward from the first magnetic pole 132a, and a second direction of magnetic field D2 taken to be inward to/outward from the second magnetic pole 132b. The first direction of magnetic field D1 and the second direction of magnetic field D2 are not parallel to each other. In addition, the first direction of magnetic field D1 points toward the central axis C or points away from the central axis C. The first direction of magnetic field D1 is substantially perpendicular to the central axis C. The phrase "substantially perpendicular" means that at least one of the components of the first direction of magnetic field D1 is perpendicular to the central axis C, or means that the first direction of magnetic field D1 is perpendicular to the central axis C. Similar phrases used herein can be explained in the similar way. The magnets 132 can be magnetized by non-parallel magnetic fields to possess the first direction of magnetic field D1 and the second direction of magnetic field D2, which are not parallel to each other.

In this embodiment, the quantity of the magnets 132 is four, but the present disclosure is not limited thereto. In some embodiments, the lens device may have only one, two or more than four magnets. In the case that the lens device has only one magnet, the magnet surrounds the lens assembly 12.

The frame 113 surrounds the lens assembly 12, the lens seat 116 and the magnets 132, and the frame 113 is not in contact with the lens assembly 12, the lens seat 116 and the magnets 132. The first coil 131 is disposed on an inner surface of the frame 113, and is not in contact with the lens assembly 12, the lens seat 116 and the magnets 132. The first magnetic pole 132a faces the first coil 131. The first direction of magnetic field D1 points toward the first coil 131 or points away from the first coil 131. The first coil 131 is wound around the lens assembly 12. The magnets 132 are located between the lens assembly 12 and the first coil 131. The first coil 131 is wound around the lens assembly 12 with the central axis C taken as a winding axis. The lens assembly 12, the lens seat 116 and the magnets 132 are movable substantially along the central axis C relative to the frame 113 and the first coil 131. From the point of view of FIG. 4, an extension direction of a part of the first coil 131 is substantially perpendicular to the first direction of magnetic field D1. The extension direction of the part of the first coil 131 is pointing into/out of the plane of the page, and the first direction of magnetic field D1 is substantially parallel to the XY-plane. The first coil 131 is configured for driving the lens assembly 12 to move substantially along the central axis C by interacting with the first magnetic pole 132a. Since the magnets 132 are located between the first coil 131 and the lens assembly 12, the movement of the first coil 131, which is electric conductible, is less than the movement of the lens assembly 12 when the lens device 1 is in operation. Therefore, it is favorable for simplifying the connection to the first coil 131, thereby reducing the possibility of failure of the connection to the first coil 131.

The first flexible connection 114 is connected to a lower surface of the lens seat 116 and a lower surface of the frame 113. The second flexible connections 115 are connected to an upper surface of the lens seat 116 and an upper surface of the frame 113. The lens seat 116 is movable between the first flexible connection 114 and the second flexible connections 115 relative to the frame 113 in a certain range. Therefore, the magnets 132 and the lens assembly 12 are movable relative to the first coil 131 substantially along the central axis C in a certain range.

The first flexible connection 114 includes a first main frame 114a and a plurality of first elastic arms 114b extending radially inward from the first main frame 114a. The first main frame 114a is fixed to the lower surface of the frame 113. The first elastic arms 114b surround the lens seat 116 and have inward ends fixed to the lower surface of the lens seat 116. The configuration of the second flexible connections 115 is similar to the configuration of the first flexible connection 114. The second flexible connection 115 has a plurality of second main frames 115a which form a shape similar to the shape of the first main frame 114a, but are separated apart from each other. In addition, the second main frames 115a are fixed to the upper surface of the frame 113. Furthermore, the second flexible connection 115 has a plurality of second elastic arms 115b which surround the lens seat 116 and have inward ends fixed to the upper surface of the lens seat 116. In this embodiment, the quantities of the first elastic arms 114b and the second elastic arms 115b are both four, but the present disclosure is not limited thereto. In some embodiments, the quantities of the first elastic arms and the second elastic arms may both be two or over four. Moreover, the first flexible connection 114 and the second flexible connections 115 are made of, for example, metal or other flexible materials.

One end of each flexible support 112 is disposed on the base plate 111, and the other end of each flexible support 112 is disposed on the frame 113. The base plate 111 is disposed on a circuit board (not shown, or refer to FIG. 11) with an image sensor. The base plate 111 has a through-hole 111a. Light from an object arrives at the image sensor by passing through the lens assembly 12 and the through-hole 111a in sequence.

The flexible supports 112 surround the lens assembly 12, and support the frame 113. By the flexible supports 112, the lens assembly 12, the lens seat 116, the magnets 132, the first coil 131 and the frame 113 are able to be moved relative to the base plate 111 in a certain range, along a direction other than the central axis C. For example, the lens seat 116, the magnets 132, the first coil 131 and the frame 113 are able to be moved relative to the base plate 111 in a direction substantially perpendicular to the central axis C. Since the frame 113 is supported by the flexible supports 112, the movement of the frame 113 substantially along the central axis C is able to be minimized. In this embodiment, the quantity of the flexible supports 112 is four, but the present disclosure is not limited thereto. In some embodiments, the lens device may have only one, two or more than four flexible supports. In the case that the lens device has only one flexible support, the flexible support surrounds the lens assembly 12.

The second coils 133 are disposed on the base plate 111 of the connect assembly 11. The second magnetic pole 132b of one of the magnets 132 faces a part of the respective second coil 133, and its second direction of magnetic field D2 points toward the part of the respective second coil 133 or points away from the part of the respective second coil 133. The second coils 133 are wound around a wounding axis which is substantially parallel to the central axis C. The second direction of magnetic field D2 is substantially parallel to the central axis C. The phrase "substantially parallel" means that at least one of the components of the second direction of magnetic field D2 is parallel to the central axis C, or means that the second direction of magnetic field D2 is parallel to the central axis C. Similar phrases used herein can be explained in the similar way.

From the point of view of FIG. 4, an extension direction of a part of each second coil 133 is substantially perpendicular to the second direction of magnetic field D2. The extension direction of the part of each second coil 133 is pointing into/out of the plane of the page, and the second direction of magnetic field D2 is substantially parallel to the Z-axis. The second coils 133 are configured for driving the lens assembly 12, the magnets 132 and the first coil 131 to move substantially along a direction other than the central axis C. For example, the lens assembly 12, the magnets 132 and the first coil 131 are able to be moved in a direction substantially perpendicular to the central axis C, by interacting with the second magnetic poles 132b.

In this embodiment, the quantity of the second coils 133 and the quantity of the magnets 132 are the same. The second coils 133 respectively correspond to the magnets 132, but the disclosure is not limited thereto. In addition, the second magnetic pole 132b faces the part of the respective second coil 133 which is close to the central axis C, but the disclosure is not limited thereto.

Figure 6A:
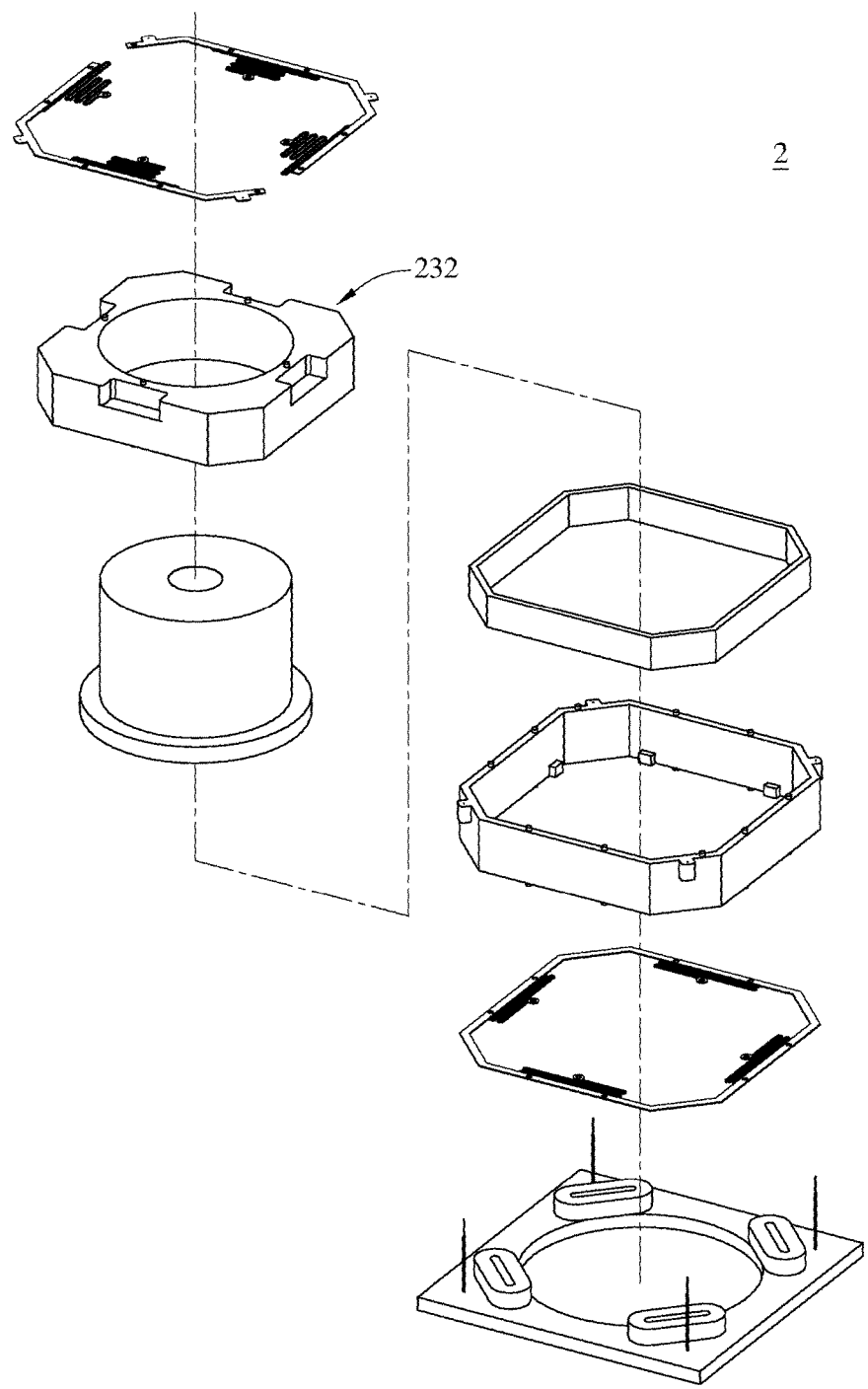
FIG. 6A is an exploded view of a lens device in accordance with another embodiment of the disclosure.

In the lens device 1, the lens seat 116 and the magnets 132 are independent objects, but the present disclosure is not limited thereto. Please refer to FIG. 6A and FIG. 6B. FIG. 6A is an exploded view of a lens device in accordance with another embodiment of the disclosure, and FIG. 6B is a cross-sectional view of a magnet of the lens device in FIG. 6A. In this embodiment, a lens device 2 is provided. The lens device 2 is similar to the lens device 1 in FIG. 2. The differences between these two embodiments are that the lens seat 116 and the magnets 132 of the lens device 1 in FIG. 2 are combined in one piece to become a ring-shaped magnet 232 of the lens device 2. The magnet 232 has a first magnetic pole 232a and a second magnetic pole 232b. The first magnetic pole 232a is located at an outer surface of the magnet 232 and is in a circle shape. The second magnetic pole 232b is located at a lower surface of the magnet 232 and is in a circle shape.

The magnet 232 has a first direction of magnetic field D1 taken to be inward to/outward from the first magnetic pole 232a, and has a second direction of magnetic field D2 taken to be inward to/outward from the second magnetic pole 232b. The first direction of magnetic field D1 and the second direction of magnetic field D2 are not parallel to each other. In addition, the first direction of magnetic field D1 points toward the central axis C or points away from the central axis C. The first direction of magnetic field D1 is substantially perpendicular to the central axis C. The second direction of magnetic field D2 is substantially parallel to the central axis C.

Figure 7A:
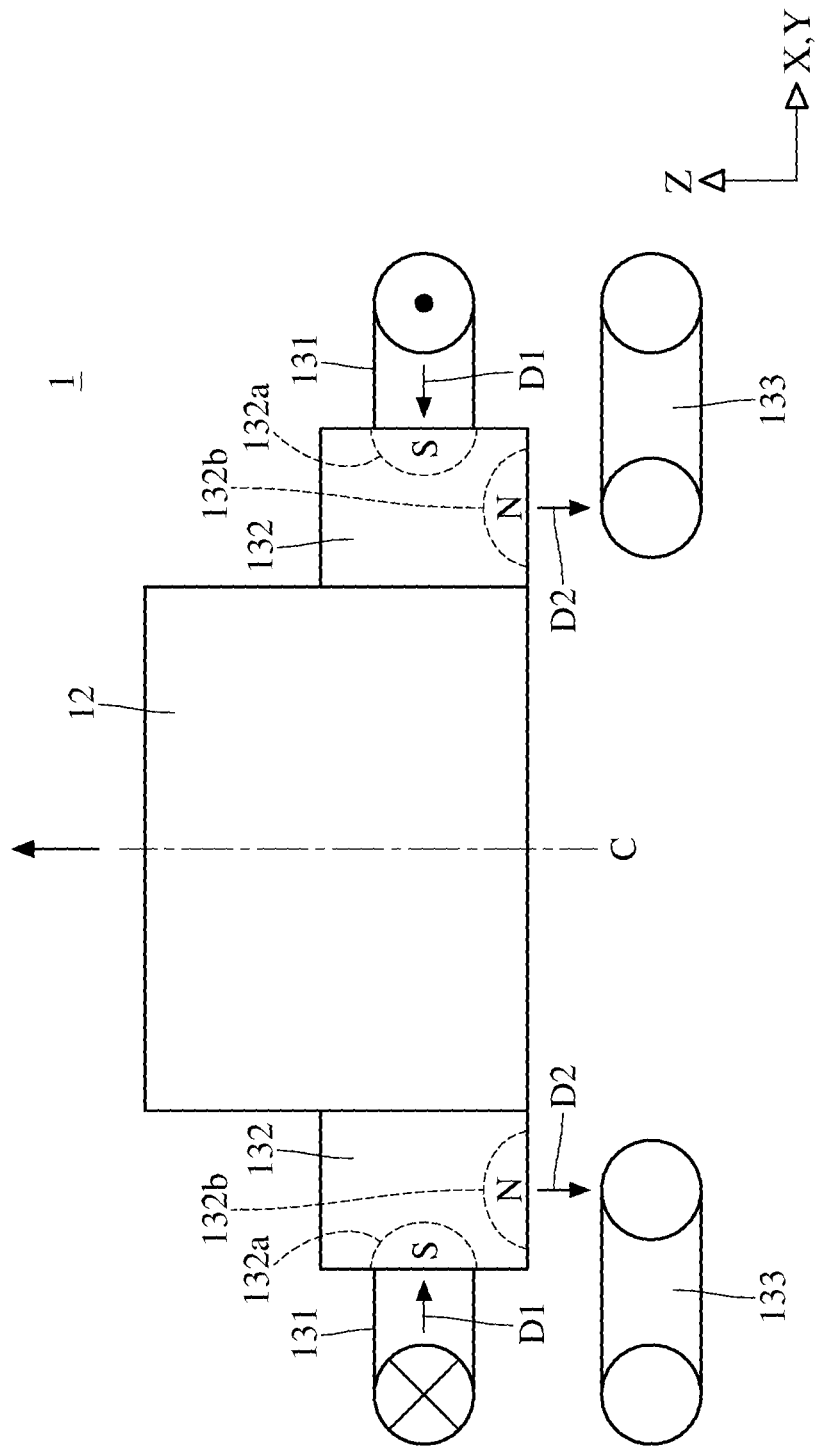
FIG. 7A is a cross-sectional view of the lens device in FIG. 4 while adjusting focus.
Figure 7B:
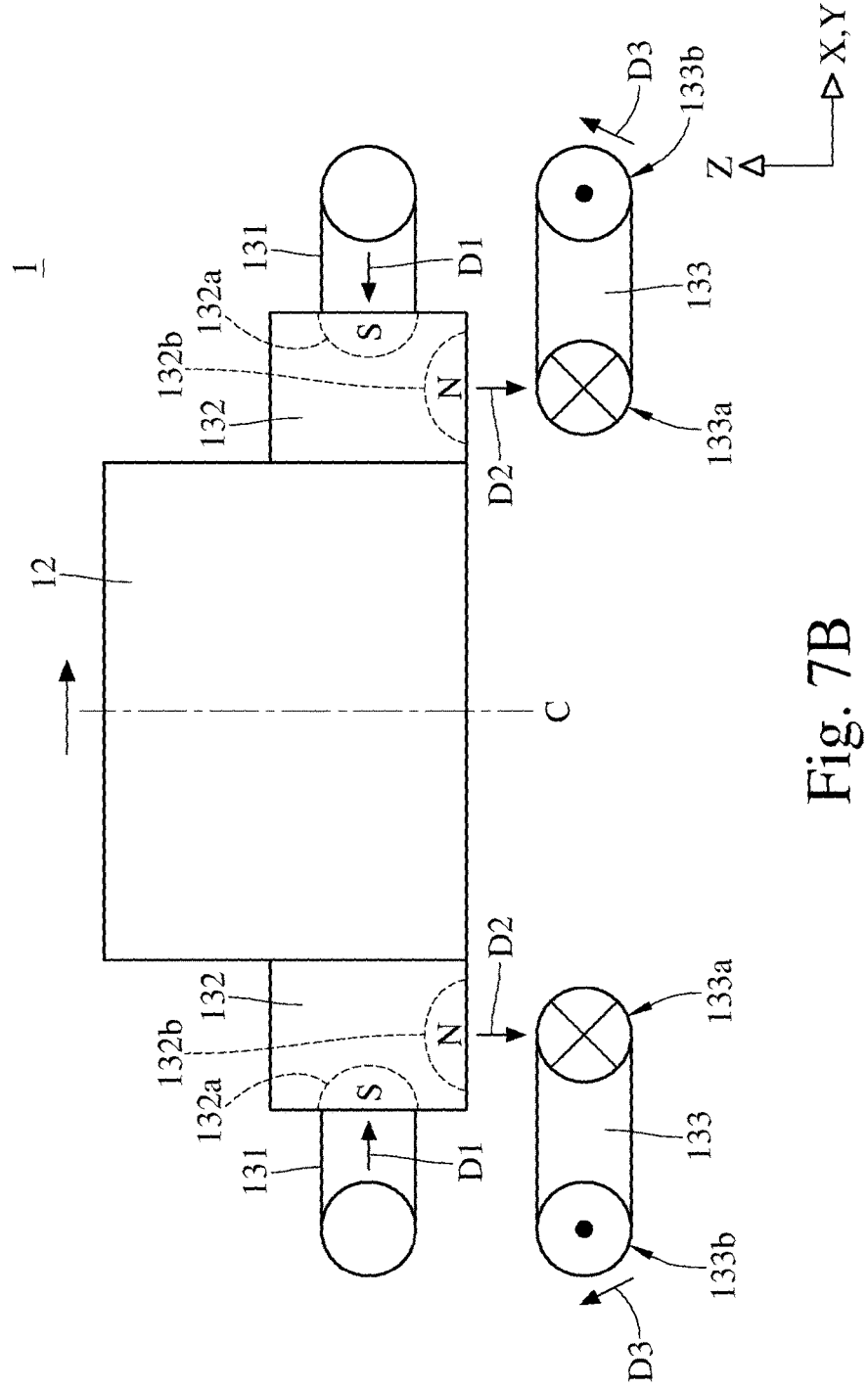
FIG. 7B is a cross-sectional view of the lens device in FIG. 4 while reducing camera shake or vibration.

Then, please refer to FIG. 7A and FIG. 7B. FIG. 7A is a cross-sectional view of the lens device in FIG. 4 while adjusting focus, and FIG. 7B is a cross-sectional view of the lens device in FIG. 4 while reducing camera shake or vibration. For the purpose of illustration, the drawings are simplified, and some of the components are omitted. In addition, it is understood that the types of magnetic poles and the directions of the magnetic lines of force are exemplary but not intending to limit the present disclosure.

For instance, as show in FIG. 7A, the magnets 132 are disposed on the lens assembly 12. For each magnet 132, the first magnetic pole 132a is south pole S, and the second magnetic poles 132b is north pole N. Thus, the first direction of magnetic field D1 points toward the central axis C, and the second direction of magnetic field D2 points toward a part of the second coil 133. An electric current passes through the first coil 131 in one direction, the direction of the electric current passing through a segment of the first coil 131, on the right-hand side of FIG. 7A, is pointing out of the plane of the page, and the direction of the electric current passing through another segment of the first coil 131, on the left-hand side of FIG. 7A, is pointing into the plane of the page. According to Right-hand rule, the first coil 131 is experiencing a magnetic force toward the negative direction of Z-axis. However, the first coil 131 is restricted in movement and indirectly supported by the flexible supports 112 in FIG. 4 through the frame 113, such that the first coil 131 is prevented from moving toward the negative direction of Z-axis, and is able to provide a reaction force toward the positive direction of Z-axis on the magnets 132. Therefore, the magnets 132 are able to be moved toward the positive direction of Z-axis as well as the lens assembly 12 to move away from the image sensor (not shown).

Then, when an electric current passes through the first coil 131 in an opposite direction, the direction of the electric current passing through the segment of the first coil 131, on the right-hand side of FIG. 7A, is pointing into the plane of the page, and the direction of the electric current passing through the segment of the first coil 131, on the left-hand side of FIG. 7A, is pointing out of the plane of the page. In such a case, the first coil 131 is experiencing a magnetic force toward the positive direction of Z-axis, and provides a reaction force toward the negative direction of Z-axis on the magnets 132. Therefore, the magnets 132 is able to be moved toward the negative direction of Z-axis as well as the lens assembly 12 to move toward the image sensor (not shown). The lens device 1 is able to adjust focus by moving the lens assembly 12 close to or away from the image sensor.

In addition, in another case, when the first magnetic pole 132a is north pole N, and the second magnetic pole 132b is south pole S, which are opposite to the case of FIG. 7A, the lens device 1 is able to adjust focus by using an electric current in an opposite direction.

Furthermore, for instance, as shown in FIG. 7B, the second magnetic pole 132b of one of the magnets 132 faces a part 133a of the corresponding second coil 133, which is relatively close to the central axis C. The second direction of magnetic field D2 is pointing downward the part 133a of the second coil 133, from the point of view of FIG. 7B. When the lens device 1 is shaked, there has an amplitude of vibration in the XY-plane. In the meantime, an electric current passes through the second coil 133 in one direction. The direction of the electric current passing through the part 133a of the second coil 133 is pointing into the plane of the page. According to Right-hand rule, the part 133a of the second coil 133 is experiencing a magnetic force toward the left-hand side of FIG. 7B. Moreover, by interacting with both the first magnetic poles 132a and the second magnetic poles 132b, the part 133b of the second coil 133 is experiencing a third direction of magnetic field D3, which is pointing upward and away from the central axis C. As shown in FIG. 7B, the third direction of magnetic field D3, which the part 133b of the second coil 133 experiences, has components pointing upward. The direction of the electric current passing through the part 133b of the second coil 133 is pointing out of the plane of the page. According to Right-hand rule, the part 133b of the second coil 133 is experiencing a magnetic force toward the left-hand side of FIG. 7B. However, the second coils 133, fixed to the base plate 111, do not substantially move toward the left-hand side of FIG. 7B, but provide a reaction force toward the right-hand side of FIG. 7B on the magnets 132. Therefore, the magnets 132 are moved toward the right-hand side of FIG. 7B as well as the lens assembly 12. In the meantime, the part 133a and the part 133b of the second coil 133 both interact with the magnet 132 so as to produce a stronger magnetic force.

Then, when an electric current passes through the second coil 133 in an opposite direction, the direction of the electric current passing through the part 133a of the second coil 133 is pointing out of the plane of the page, and the direction of the electric current passing through the part 133b of the second coil 133 is pointing into the plane of the page. In the meantime, the part 133a and the part 133b of the second coil 133 are experiencing a magnetic force toward the right-hand side of FIG. 7B, and provide a reaction force toward the left-hand side on the magnet 132. Therefore, the magnet 132 is moved toward the left-hand side of FIG. 7B as well as the lens assembly 12. The lens device 1 is able to reduce camera shake or vibration by moving lens assembly 12 in the XY-plane. The second coils 133 can be provided with electric currents in different directions according to actual requirements, so it is favorable for adjusting the direction and the velocity of the movement of the lens assembly 12 in the XY-plane.

In addition, in another case, when the first magnetic poles 132a is north pole N, and the second magnetic pole 132b is south pole S, which are opposite to the case of FIG. 7B, the lens device 1 is able to reduce camera shake or vibration by using an electric current in an opposite direction.

Each magnet 132 is able to respectively provide the first direction of magnetic field D1 and the second direction of magnetic field D2, which are not parallel to each other, to the first coil 131 and the second coil 133. Thus, the amount of the magnets 132 of the lens device 1 of the present disclosure is less than that of the conventional lens device, so it is favorable for reducing the size and weight of the lens device 1.

Figure 7C:
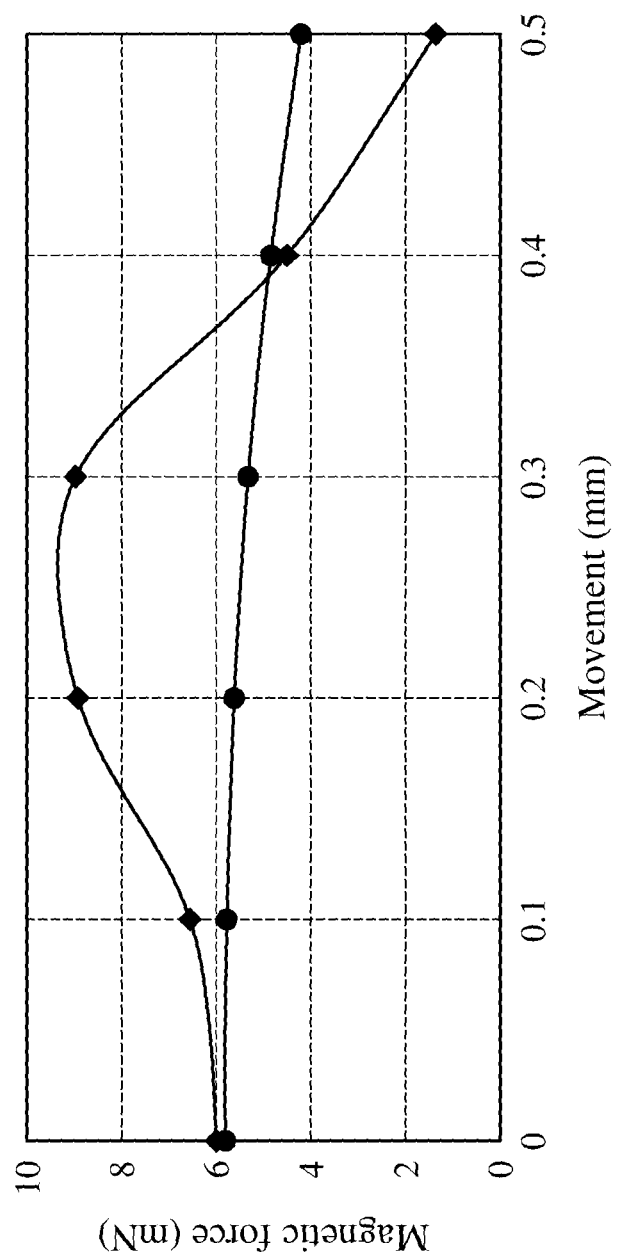
FIG. 7C is a comparison chart of simulation of focus adjustment between the lens device in FIG. 4 and another lens device.
Figure 7D:
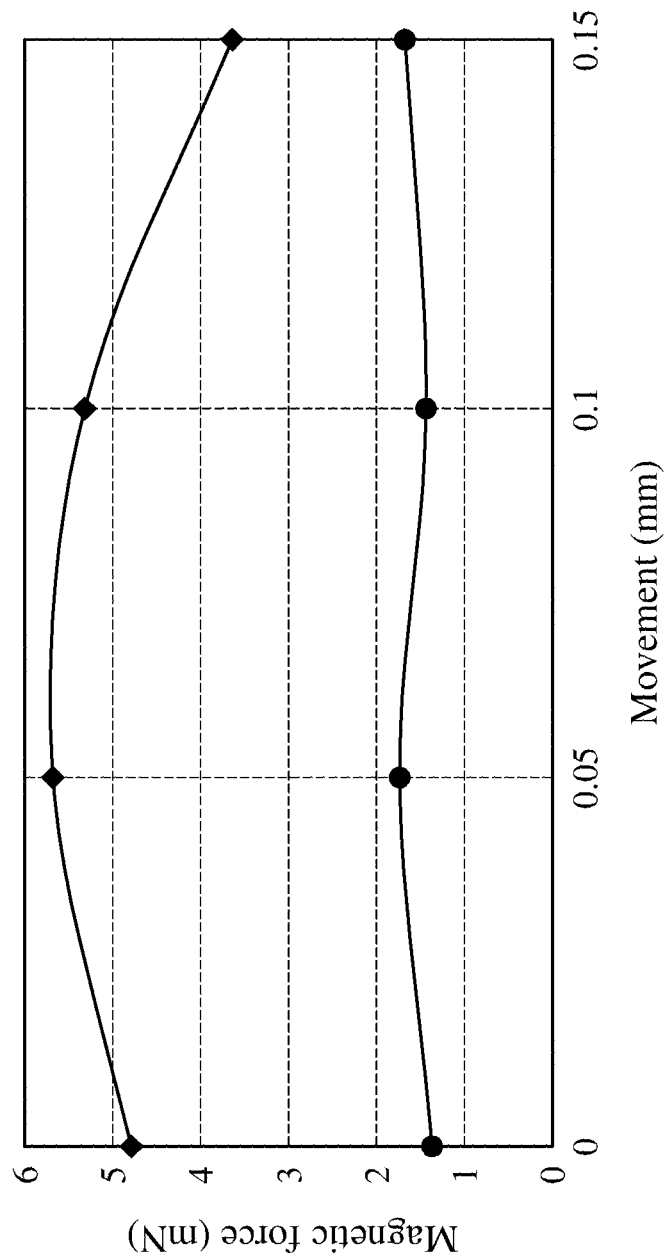
FIG. 7D is a comparison chart of simulation of camera vibration reduction between the lens device in FIG. 4 and another lens device.

Please refer to FIG. 7C to FIG. 7D. FIG. 7C is a comparison chart of simulation of focus adjustment between the lens device in FIG. 4 and a conventional lens device, and FIG. 7D is a comparison chart of simulation of camera vibration reduction between the lens device in FIG. 4 and a conventional lens device. It is noted that the conditions during the simulation are exemplary, but not intending to limit the present disclosure. There are two lens devices in the simulation, one is the lens device in FIG. 4, and the other is a lens device that its second magnetic pole faces away from the central axis, and its first direction of magnetic field and second direction of magnetic field both point toward the central axis or point away from the central axis.

During the simulation of FIG. 7C, the lens device 1 and the another lens device are provided with the same electric current for adjusting focus. The curved line with diamond-shaped points in FIG. 7C represents the relationship between the magnetic force on the lens assembly 12 of the lens device 1 and the movement of the lens assembly 12 of the lens device 1, and the curved line with round-shaped points in FIG. 7C represents the relationship between the magnetic force on the lens assembly of the another lens device and the movement of the lens assembly of the another lens device. As shown in FIG. 7C, in the range of the movement from 0 mm to 0.4 mm, the magnetic force on the lens assembly 12 of the lens device 1 is larger than the magnetic force on the lens assembly of the another lens device. Thus, by the lens device 1, the time spent on adjusting focus is reduced.

Then, during the simulation of FIG. 7C, the lens device 1 and the another lens device are provided with the same electric current to reduce camera shake or vibration. The curved line with diamond-shaped points in FIG. 7C represents the relationship between the magnetic force on the lens assembly 12 of the lens device 1 and the movement of the lens assembly 12 of the lens device 1, and the curved line with round-shaped points in FIG. 7C represents the relationship between the magnetic force on the lens assembly of the another lens device and the movement of the lens assembly of the another lens device. As shown in FIG. 7D, the magnetic force on the lens assembly 12 of the lens device 1 is larger than the magnetic force on the lens assembly of the another lens device. Thus, by the lens device 1, the time spent on reducing camera shake or vibration is reduced.

Figure 8:
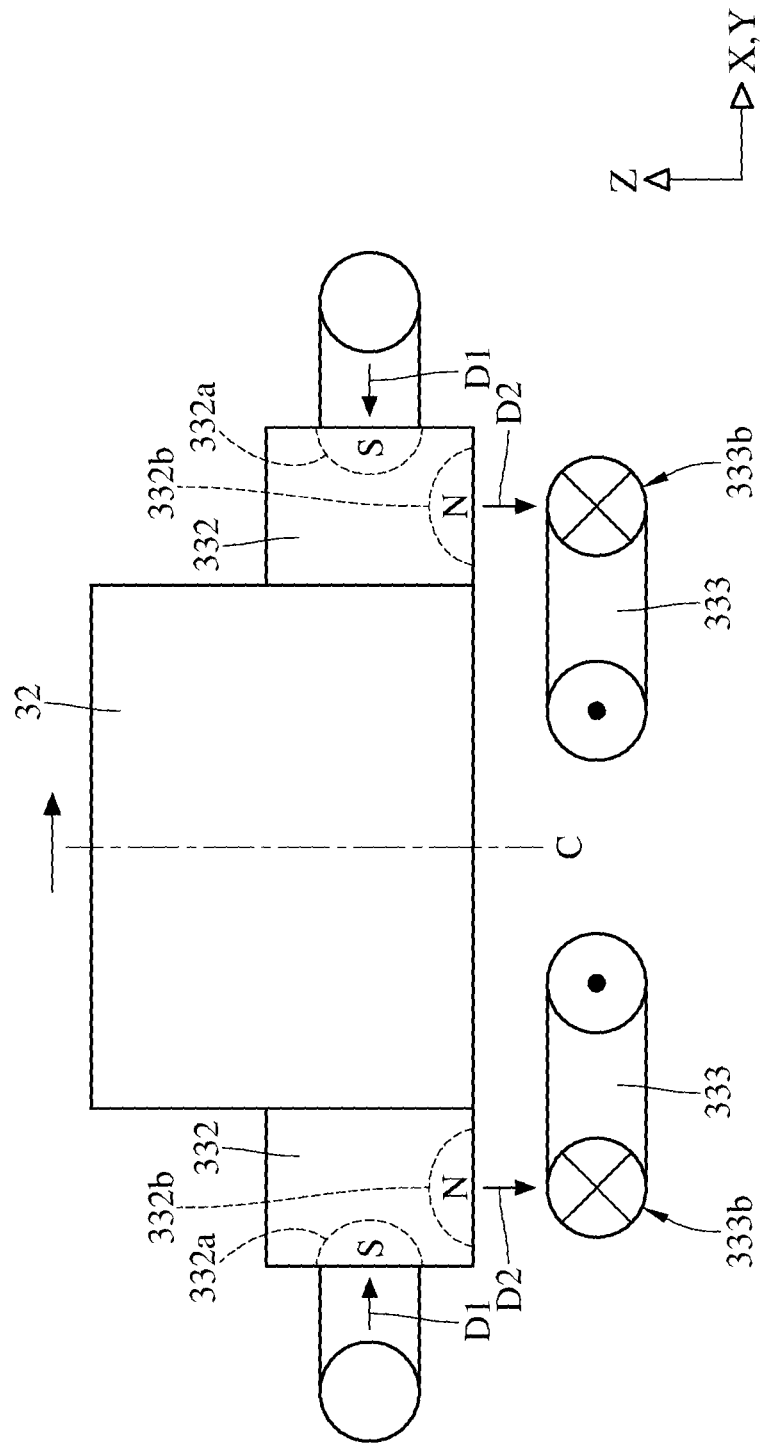
FIG. 8 is a cross-sectional view of a lens device in accordance with yet another embodiment of the disclosure while reducing camera shake or vibration.

Please refer to FIG. 8, which is a cross-sectional view of a lens device in accordance with yet another embodiment of the disclosure while reducing camera shake or vibration. In this embodiment, a lens device 3 is provided. The lens device 3 is similar to the lens device 1 in FIG. 7B. The differences between these embodiments are that the relationship between the magnets and the second coils of the lens device. In this embodiment, the second magnetic pole 332b of the magnet 332 faces the part 333b of the second coil 333 which is relatively away from the central axis C. The second direction of magnetic field D2 points the part 333b of the second coil 333 or points away from the part 333b of the second coil 333.

For instance, the magnets 332 are disposed on the lens assembly 32, the first magnetic pole 332a is south pole S, and the second magnetic pole 332b is north pole N. Thus, the first direction of magnetic field D1 points toward the central axis C, and the second direction of magnetic field D2 points toward the part 333b of the second coil 333. When the lens device 3 is shaked, there has an amplitude of vibration in the XY-plane. In the meantime, an electric current passes through the second coil 333 in one direction. The direction of the electric current passing through the part 333b of the second coil 333 is pointing into the plane of the page. The part 333b of the second coil 333 is experiencing a magnetic force toward the left-hand side of FIG. 8, and provides a reaction force toward the right-hand side of FIG. 8 on the magnet 332. Therefore, the magnets 332 are moved toward the right-hand side of FIG. 8 as well as the lens assembly 32.

Then, when an electric current passes through the second coil 333 in an opposite direction, the direction of the electric current passing through the part 333b of the second coil 333 is pointing out of the plane of the page. In the meantime, the part 333b of the second coil 333 is experiencing a magnetic force toward the right-hand side of FIG. 8, and provides a reaction force toward the left-hand side of FIG. 8 on the magnet 332. Therefore, the magnets 332 are moved toward the left-hand side of FIG. 8 as well as the lens assembly 32. The lens device 3 is able to reduce camera shake or vibration by moving lens assembly 32 in the XY-plane. The second coils 333 can be provided with electric currents in different directions according to actual requirements, so it is favorable for adjusting the direction and the velocity of the movement of the lens assembly 32 in the XY-plane.

In addition, in another case, when the first magnetic pole 332a is north pole N and the second magnetic pole 332b is south pole S, the lens device 3 is able to reduce camera shake or vibration by using an electric current in an opposite direction.

Figure 9A:
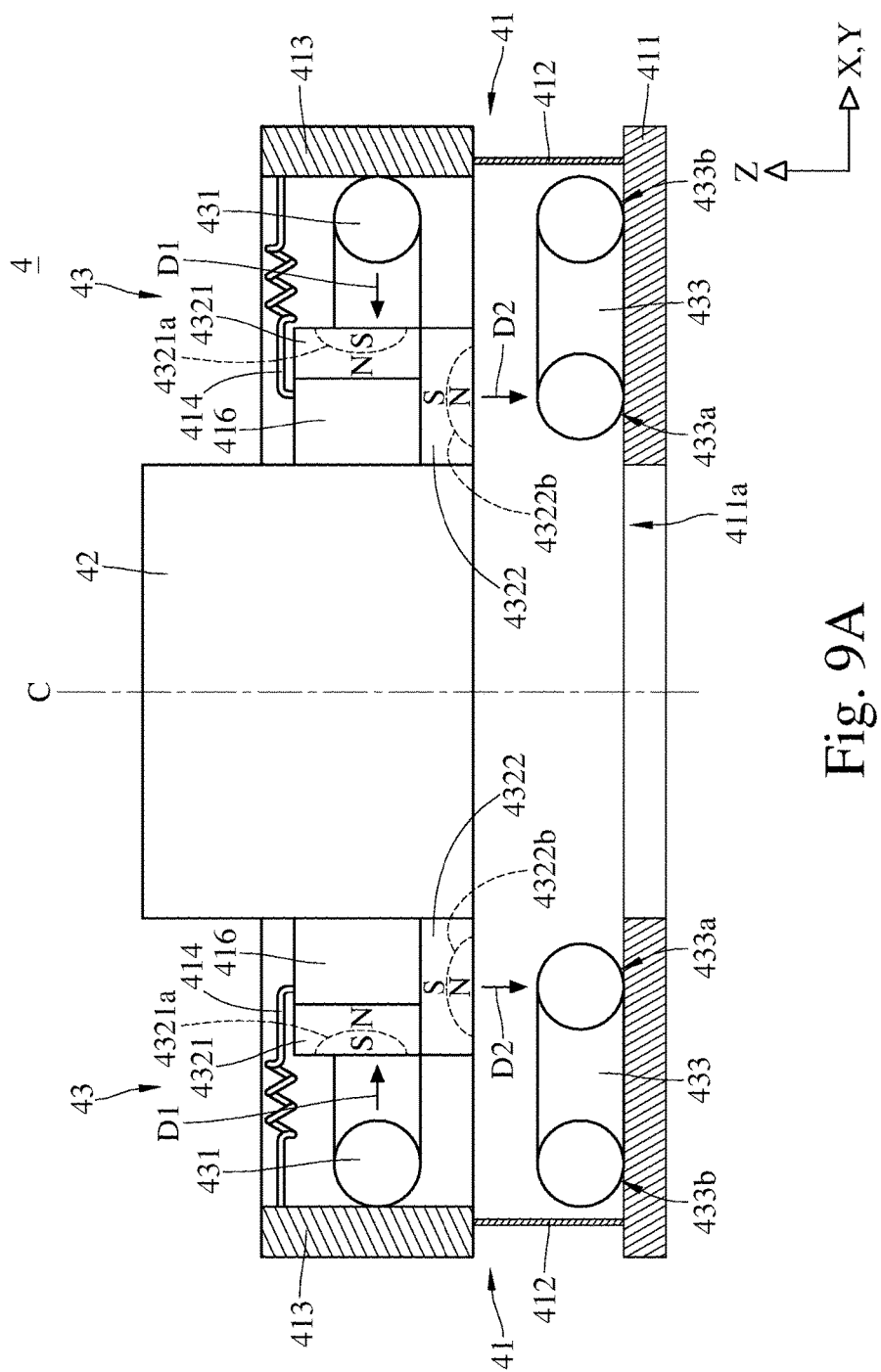
FIG. 9A is a cross-sectional view of a lens device in accordance with still another embodiment of the disclosure.

Please refer to FIG. 9A, which is a cross-sectional view of a lens device in accordance with still another embodiment of the disclosure. In this embodiment, a lens device 4 is provided. In addition, for the purpose of illustration, the lens device 4 in FIG. 9A is simplified. The lens device 4 is similar to the lens device 1 in FIG. 4. The lens device 4 includes a connect assembly 41, a lens assembly 42 and a drive assembly 43. The connect assembly 41 includes a base plate 411, a plurality of flexible supports 412, a frame 413, a plurality of flexible connections 414 and a lens seat 416. The drive assembly 43 includes a first coil 431 and a plurality of second coils 433.

There are similarities between the lens device 4 and the lens device 1 in FIG. 4. One end of each flexible support 412 is disposed on the base plate 411, and the other end of each flexible support 412 is disposed on the frame 413. The base plate 411 has a through-hole 411a for light to pass through. The second coils 433 are disposed on the base plate 411 of the connect assembly 41. The lens assembly 42 has a central axis C. The second coils 433 are wound around a winding axis which is substantially parallel to the central axis C. The first coil 431 is disposed on an inner surface of the frame 413. The lens assembly 42 is disposed on the lens seat 416. The flexible connections 414 are connected to the lens seat 416 and the frame 413. Therefore, the lens assembly 42 and the frame 413 are movably connected by the flexible connections 414. The lens seat 416, the first coil 431, the frame 413 and the flexible supports 412 surround the lens assembly 42. The first coil 431 is wound around the lens assembly 42 with the central axis C taken as a winding axis.

Then, the differences between the lens device 4 and the lens device 1 in FIG. 4 is that the drive assembly 43 further includes a plurality of first magnets 4321 and a plurality of second magnets 4322. Each first magnet 4321 and each second magnet 4322 are magnetic materials magnetized in their thickness directions. Each first magnet 4321 has a first magnetic pole 4321a and a first direction of magnetic field D1 taken to be inward to/outward from the first magnetic pole 4321a. Each second magnet 4322 has a second magnetic pole 4322b and a second direction of magnetic field D2 taken to be inward to/outward from the second magnetic pole 4322b.

The first magnets 4321 and the second magnets 4322 are connected by the lens seat 416. The first magnets 4321 and the second magnets 4322 are connected to the lens assembly 42 by the lens seat 416. The first coil 431 is wound around the first magnets 4321. The first magnets 4321 are located between the first coil 431 and the lens assembly 42. Since the first magnets 4321 are located between the first coil 431 and the lens assembly 42, the movement of the first coil 431, which is electric conductible, is less than the movement of the lens assembly 42 when the lens device 4 is in operation. Therefore, it is favorable for simplifying the connection to the first coil 431, thereby reducing the possibility of failure of the connection to the first coil 431.

The first direction of magnetic field D1 and the second direction of magnetic field D2 are not parallel to each other. In addition, the first direction of magnetic field D1 points toward the central axis C or points away from the central axis C, and the second direction of magnetic field D2 points toward the part 433a and part 433b of the second coil 433. Furthermore, the first direction of magnetic field D1 is substantially perpendicular to the central axis C. The second direction of magnetic field D2 is substantially parallel to the central axis C. In addition, an extension direction of a part of the first coil 431 is substantially perpendicular to the first direction of magnetic field D1, and an extension direction of either the part 433a or the part 433b of the second coil 433 is substantially perpendicular to the second direction of magnetic field D2. The first coil 431 is configured for driving the lens assembly 42, the lens seat 416, the first magnets 4321 and the second magnets 4322 to move substantially along the central axis C relative to the frame 413 and the first coil 431 by interacting with the first magnetic poles 4321a. The second coils 433 are configured for driving the lens assembly 42, the lens seat 416, the first magnets 4321 and the second magnets 4322 to move along a direction other than the central axis C by interacting with the second magnetic poles 4322b.

Additionally, the quantity of the second magnets 4322 and the quantity of the second coils 433 are the same. The second magnets 4322 surround the lens assembly 42. The second coils 433 respectively correspond to the second magnets 4322. However, the quantity of the first magnets 4321 and the quantity of the second magnets 4322 can be either the same or different. The first magnets 4321 are magnetic materials in a circle shape and radially magnetized. The second magnets 4322 are magnetic materials in a circle shape and magnetized in its thickness direction.

Figure 9B:
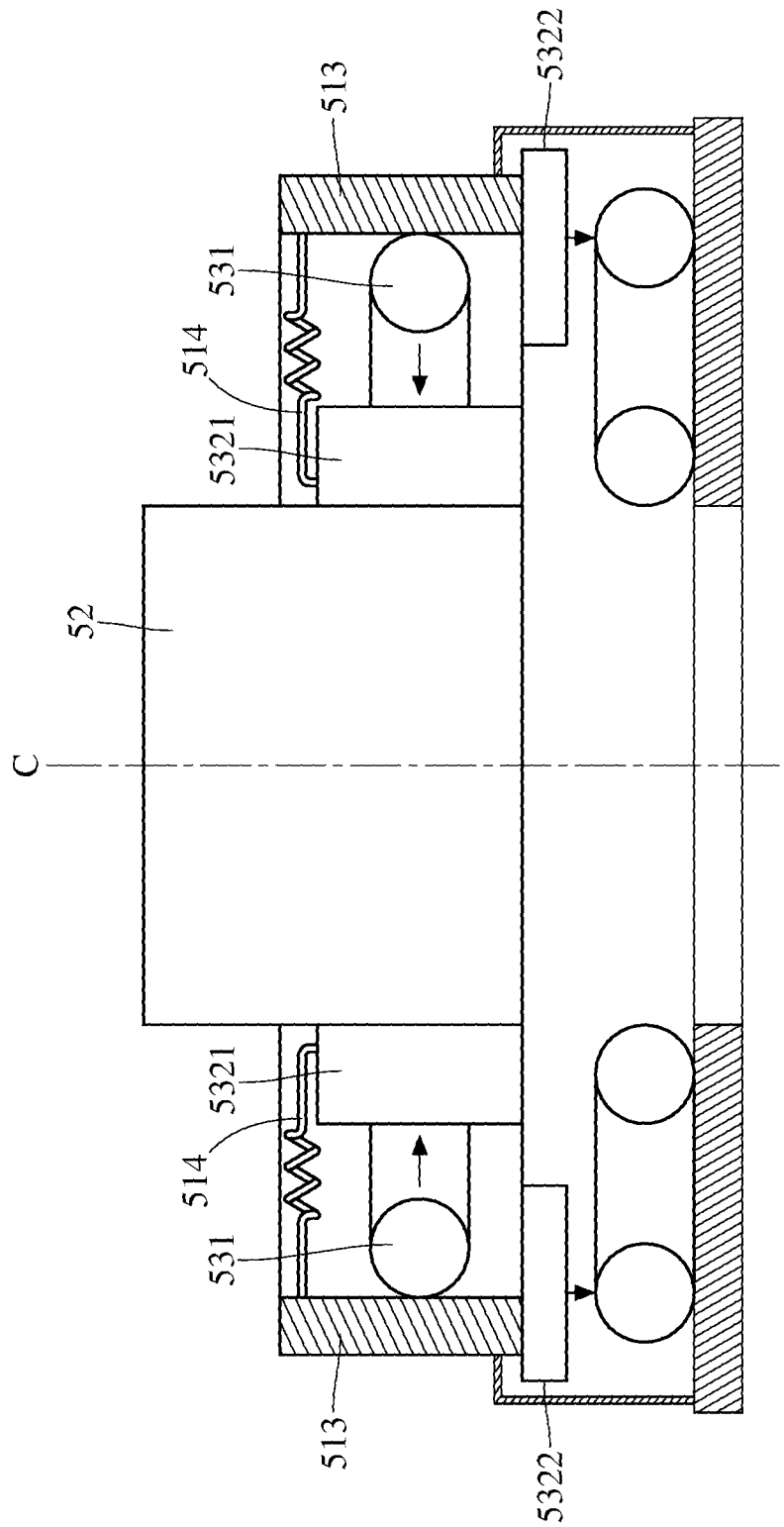
FIG. 9B is a cross-sectional view of a lens device in accordance with still yet another embodiment of the disclosure.

Please refer to FIG. 9B, which is a cross-sectional view of a lens device in accordance with still yet another embodiment of the disclosure. In this embodiment, a lens device 5 is provided. In addition, for the purpose of illustration, the lens device 5 in FIG. 9B is simplified. The lens device 5 is similar to the lens device 4 in FIG. 9A. The differences between the embodiments are that the second magnets 5322 of the lens device 5 in FIG. 9B are disposed on the frame 513 and by that means disposed on the first coil 531. The first coil 531 and the second magnets 5322 are connected by the frame 513. The first magnets 5321 are disposed on the lens assembly 52. The frame 513 and the first magnets 5321 are connected by the flexible connections 514. Therefore, the lens assembly 52 and the frame 513 are connected by the flexible connections 514. Thus, the first coil 531 is able to drive the lens assembly 52 to move substantially along the central axis C relative to the frame 513 for adjusting focus only by the lens assembly 52 and the first magnets 5321 but without the second magnets 5322. Therefore, electrical energy for adjusting focus is reduced.

Figure 10:
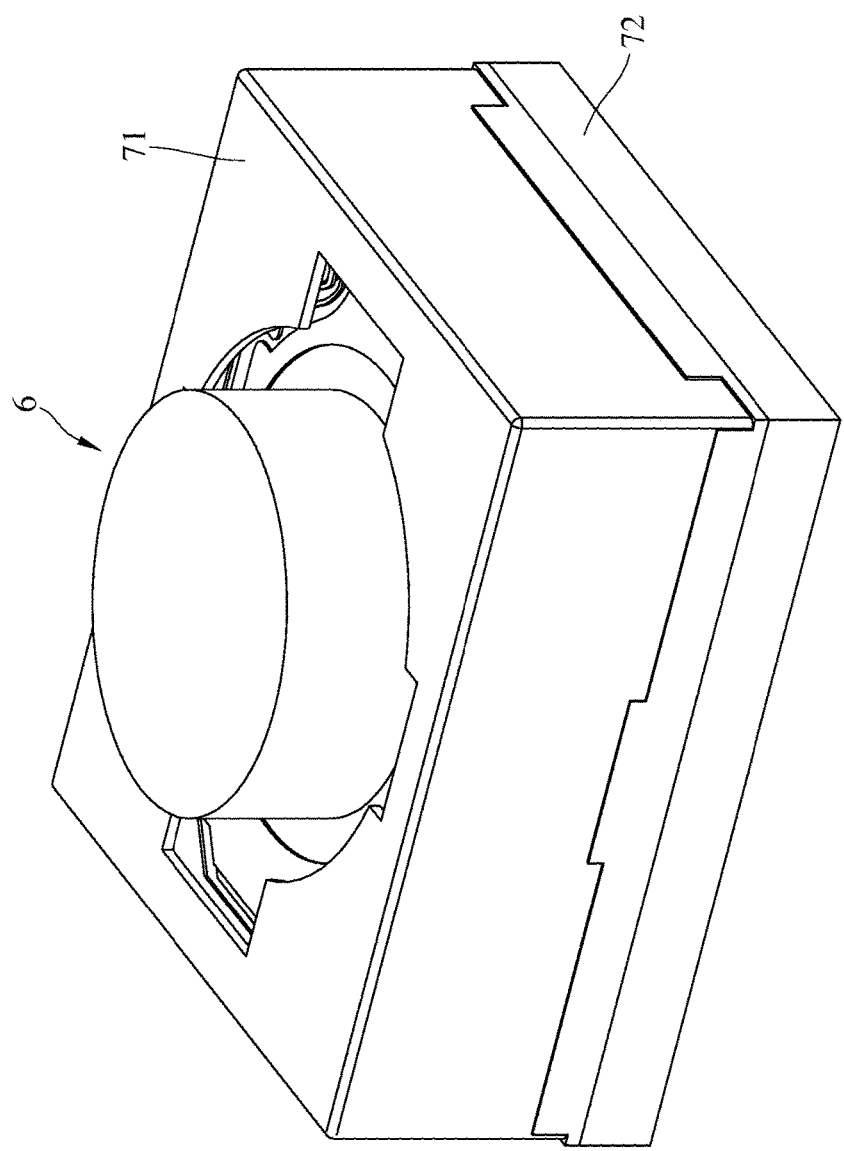
FIG. 10 is a perspective view of a lens device in accordance with yet a further embodiment of the disclosure.
Figure 11:
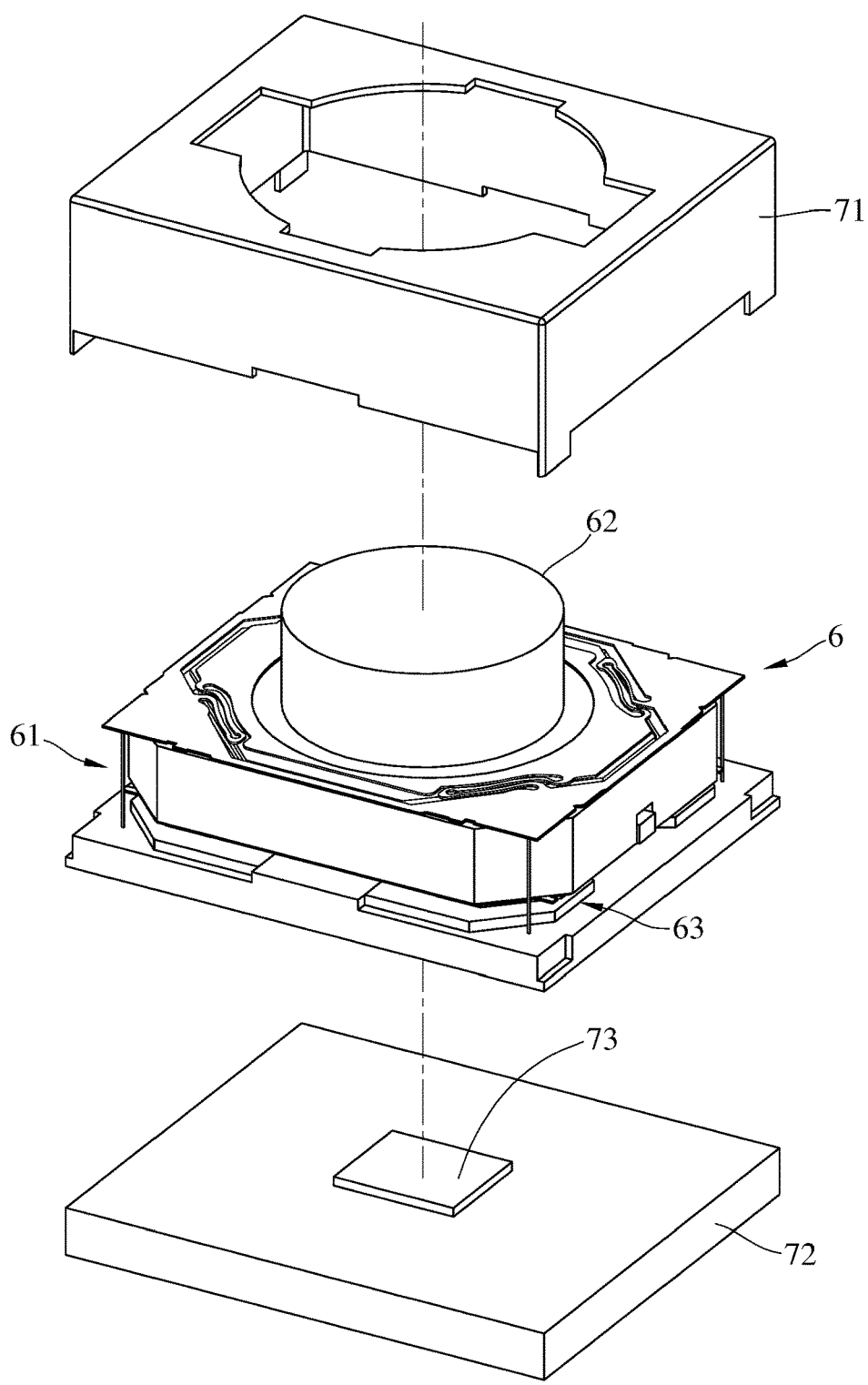
FIG. 11 is an exploded view of the lens device in FIG. 10.

Please refer to FIG. 10 to FIG. 11. FIG. 10 is a perspective view of a lens device in accordance with yet a further embodiment of the disclosure. FIG. 11 is an exploded view in FIG. 10. In this embodiment, a lens device 6 is provided. The lens device 6 is disposed on a circuit board 72 with an image sensor 73 and is covered by a cover 71.

Figure 12:
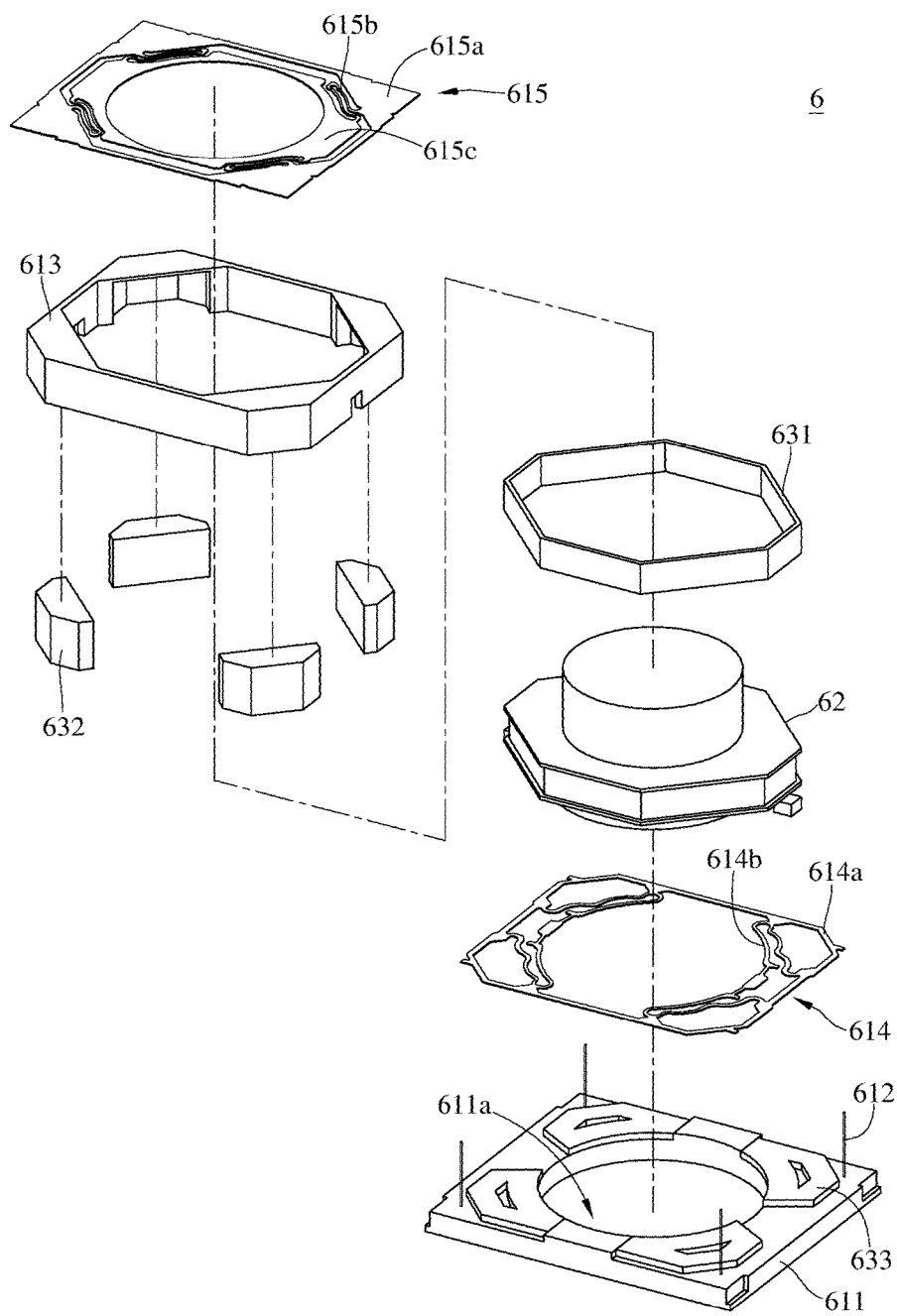
FIG. 12 is an exploded view of the lens device in FIG. 11.

Please refer to FIG. 11 to FIG. 12. FIG. 12 is an exploded view in FIG. 11. In this embodiment, the lens device 6 includes a connect assembly 61, a lens assembly 62 and a drive assembly 63. The connect assembly 61 includes a base plate 611, four flexible supports 612, a frame 613, a first flexible connection 614 and a second flexible connection 615. The drive assembly 63 includes a first coil 631, four magnets 632 and four second coils 633.

Figure 13:
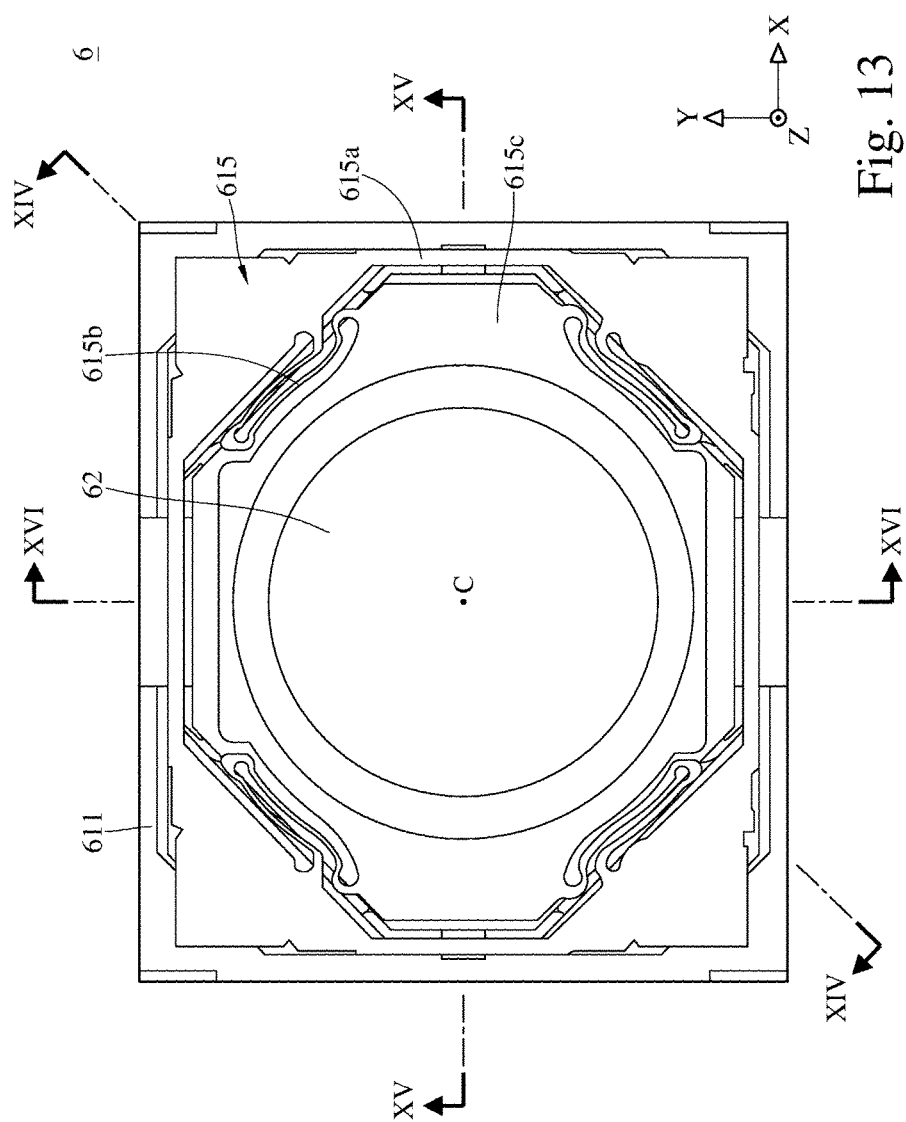
FIG. 13 is a top view of the lens device in FIG. 11.
Figure 14:
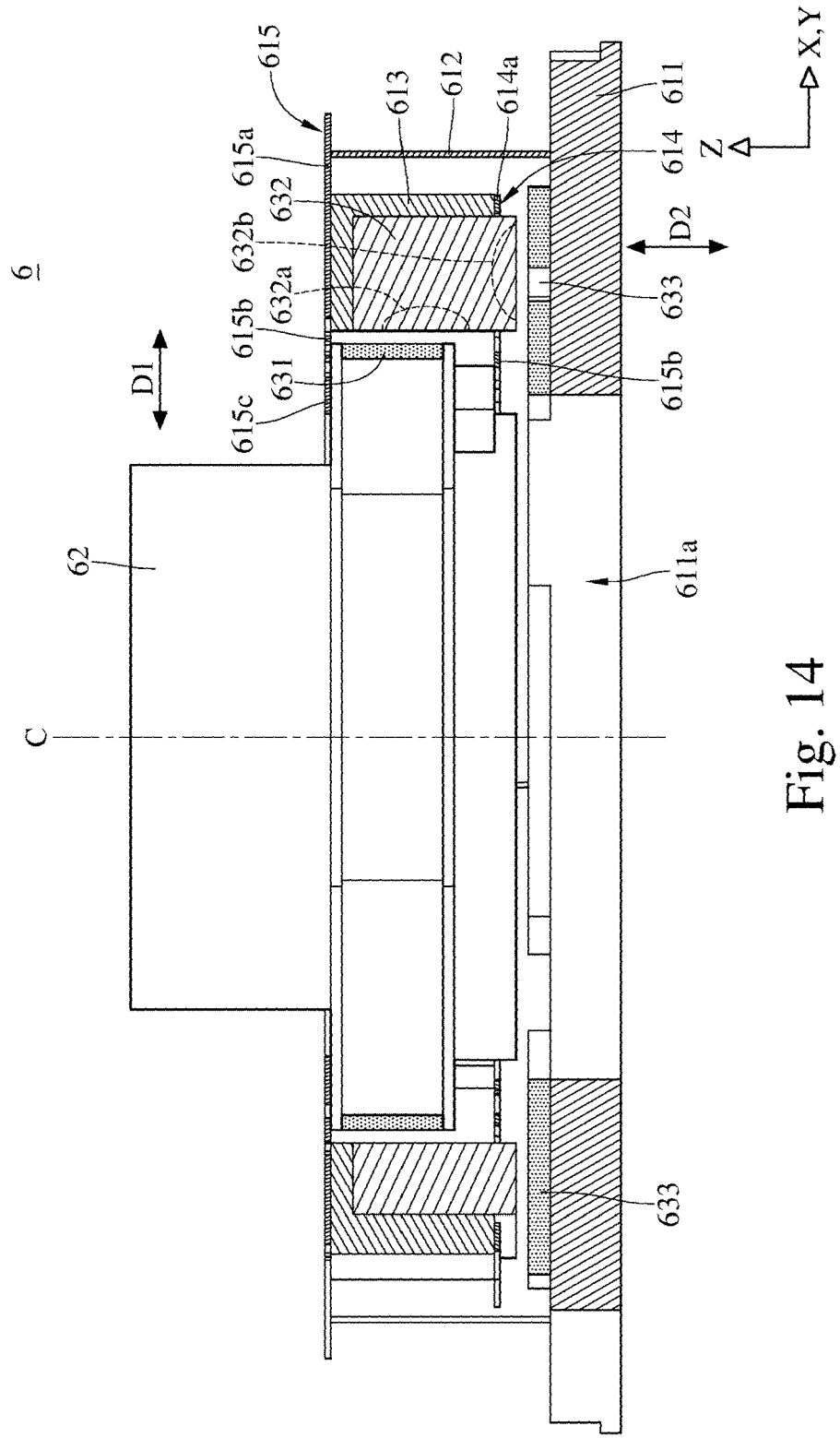
FIG. 14 is a cross-sectional view of the lens device in FIG. 13 taken along line XIV-XIV.
Figure 15:
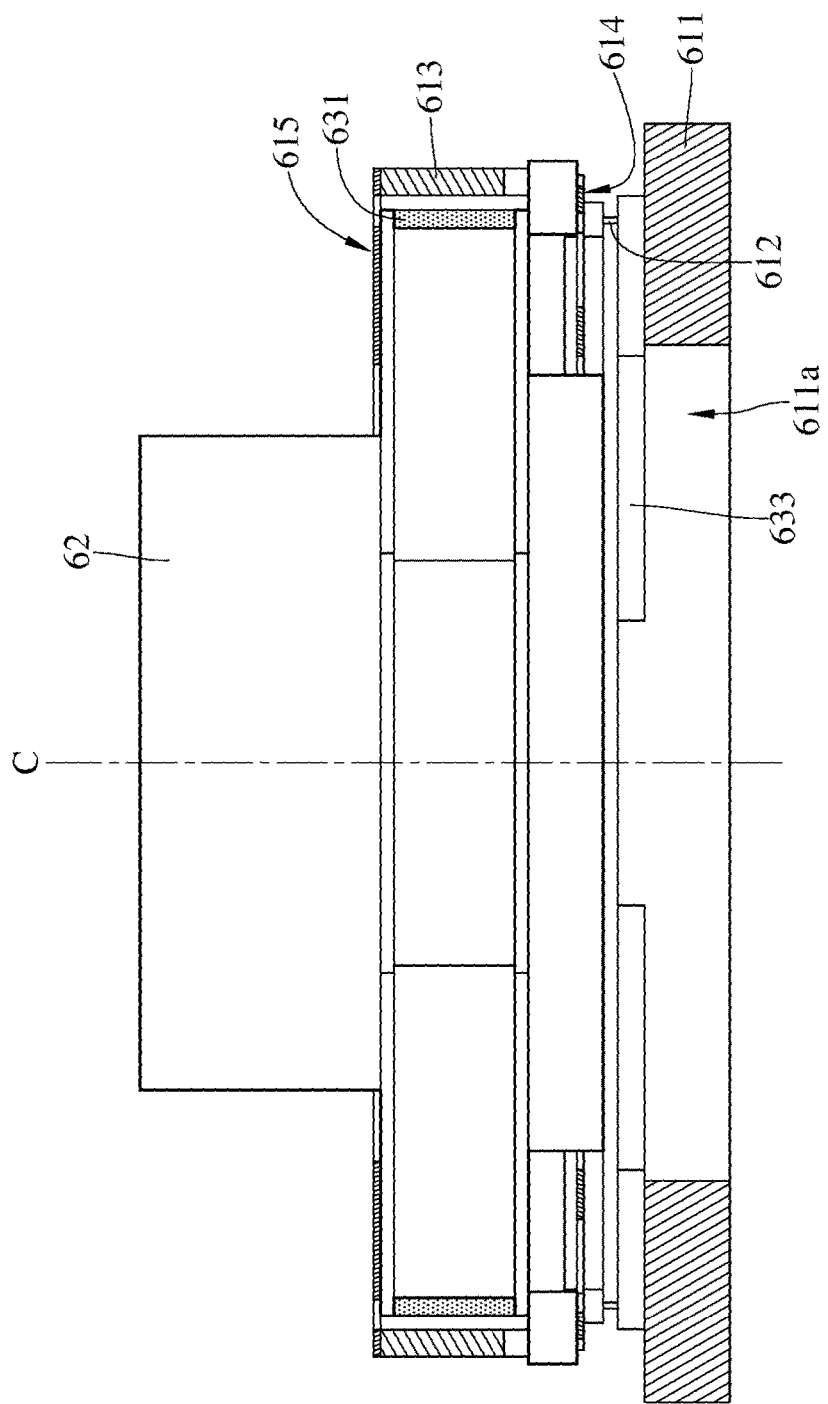
FIG. 15 is a front cross-sectional view of the lens device in FIG. 13 taken along line XV-XV.
Figure 16:
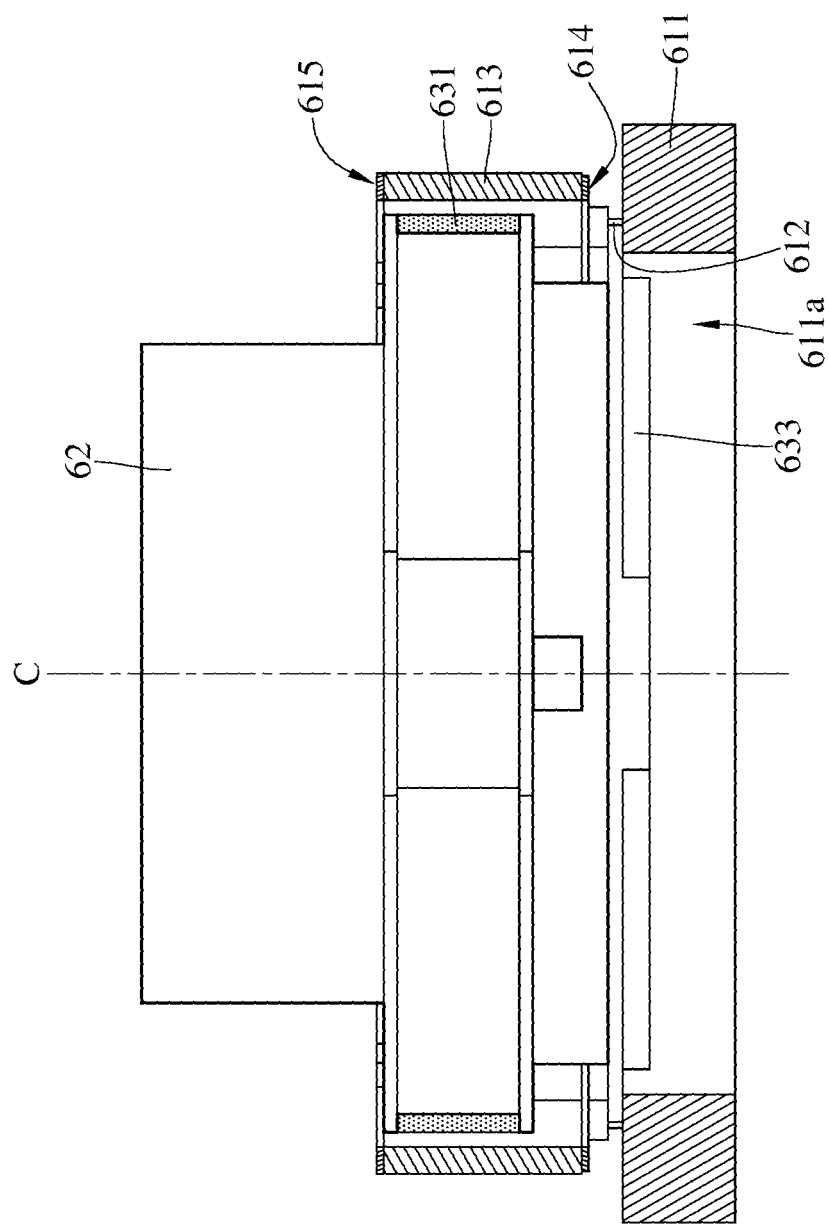
FIG. 16 is a front cross-sectional view of the lens device in FIG. 13 taken along line XVI-XVI.

Please refer to FIG. 12 to FIG. 16. FIG. 13 is a top view in FIG. 11. FIG. 14 is a cross-sectional view as taken along line XIV-XIV in FIG. 13. FIG. 15 is a front cross-sectional view as taken along line XV-XV in FIG. 13. FIG. 16 is a front cross-sectional view as taken along line XVI-XVI in FIG. 13.

The lens assembly 62 has a central axis C. The first coil 631 is disposed on and wound around the lens assembly 62 with the central axis C taken as a winding axis. The frame 613 surrounds the lens assembly 62 and the first coil 631, and the frame 613 is not in contact with the lens assembly 62 and the first coil 631. The magnets 632 are disposed on the frame 613, and are not contact with the lens assembly 62 and the first coil 631. The magnets 632 surround the lens assembly 62 and the first coil 631. Some segments of the first coil 631 are located between the lens assembly 62 and the magnets 632.

The first flexible connection 614 is connected to a lower surface of the frame 613, and a part of the first flexible connection 614 is located between the lens assembly 62 and the base plate 611. The second flexible connection 615 is connected to an upper surface of the frame 613. A part of the lens assembly 62 is located between the first flexible connection 614 and the second flexible connection 615. One end of each flexible support 612 is disposed on the base plate 611, and the other end of each flexible support 612 is disposed on the frame 613 through the second flexible connection 615. The second coils 633 are disposed on the base plate 611.

In addition, each magnet 632 has a first magnetic pole 632a and a second magnetic pole 632b. The first magnetic pole 632a and the second magnetic pole 632b are respectively located at the two surfaces of the magnet 632, which are adjacent to each other. The first magnetic pole 632a faces toward the lens assembly 62 and the first coil 631. Each magnet 632 has a first direction of magnetic field D1 taken to be inward to/outward from the first magnetic pole 632a, and has a second direction of magnetic field D2 taken to be inward to/outward from the second magnetic pole 632b. The first direction of magnetic field D1 and the second direction of magnetic field D2 are not parallel to each other. In addition, the first direction of magnetic field D1 points toward the central axis C or points away from the central axis C. The first direction of magnetic field D1 is substantially perpendicular to the central axis C. The first direction of magnetic field D1 points toward the first coil 631 or points away from the first coil 631. An extension direction of a part of the first coil 631 is substantially perpendicular to the first direction of magnetic field D1. The first coil 631 is configured for driving the lens assembly 62 and the first coil 631 to move substantially along the central axis C relative to frame 613 and the magnets 632 by interacting with the first magnetic pole 632a.

The first flexible connection 614 includes a main frame 614a and two first elastic arms 614b extending radially inward from the main frame 614a. The main frame 614a is fixed to the lower surface of the frame 613. The first elastic arms 614b are located between the lens assembly 62 and the base plate 611. The second flexible connection 615 includes an outer frame 615a, four second elastic arms 615b extending radially inward from the outer frame 615a and an inner frame 615c extending inward from the second elastic arms 615b. The outer frame 615a is connected to the upper surface of the frame 613, and the part of the lens assembly 62 is located between the first elastic arms 614b of the first flexible connection 614 and the inner frame 615c of the second flexible connection 615. The lens assembly 62 and the first coil 631 are restricted in movement and blocked by the first elastic arms 614b of the first flexible connection 614 and the inner frame 615c of the second flexible connection 615, such that the lens assembly 62 and the first coil 631 are prevented from being moved along the central axis C.

The frame 613 is supported by the flexible supports 612 which surround the lens assembly 62. The lens assembly 62, the first coil 631, the magnets 632 and the frame 613 are able to be moved along a direction other than the central axis C relative to the base plate 611 by the flexible supports 612. The base plate 611 has a through-hole 611a. Light from an object arrives at the image sensor by passing through the lens assembly 62 and the through-hole 611a in sequence. The second magnetic pole 632b faces a part of the second coil 633. The second direction of magnetic field D2 points toward the second coil 633. In addition, the second coils 633 are wound substantially parallel to the central axis C, and the second direction of magnetic field D2 is substantially parallel to the central axis C.

An extension direction of a part of each second coil 633 is substantially perpendicular to the second direction of magnetic field D2. The second direction of magnetic field D2 is substantially parallel to the Z-axis. The second coils 633 are configured for driving the lens assembly 62, the first coil 631, the magnets 632 and the frame 613 to move along a direction other than the central axis C, such as a direction substantially perpendicular to the central axis C, by interacting with the second magnetic poles 632b.

Each magnet 632 is able to respectively provide the first direction of magnetic field D1 and the second direction of magnetic field D2, which are not parallel to each other, to the first coil 631 and the second coil 633. Thus, the amount of the magnets 632 is reduced, thereby reducing the size and weight of the lens device 6.

Figure 17:
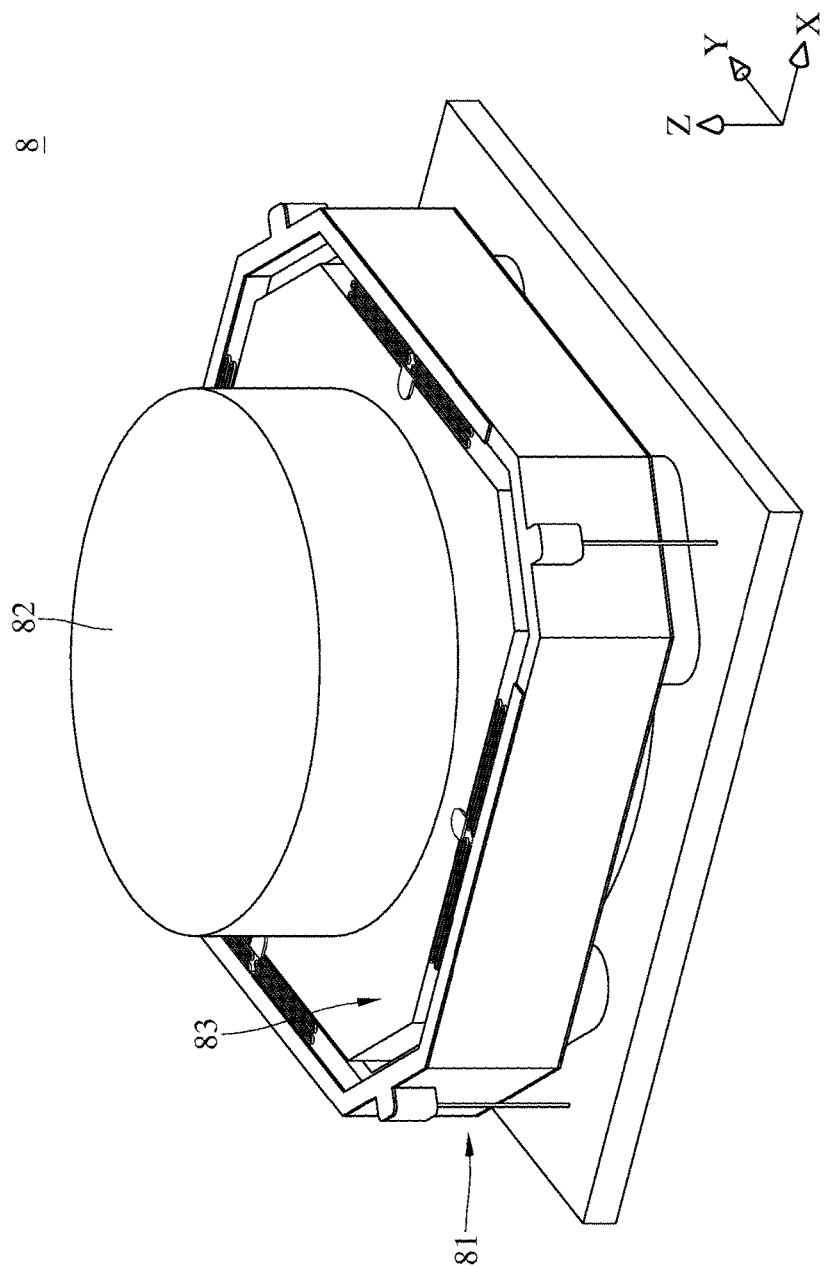
FIG. 17 is a perspective view of a lens device in accordance with still yet a further embodiment of the disclosure.
Figure 18:
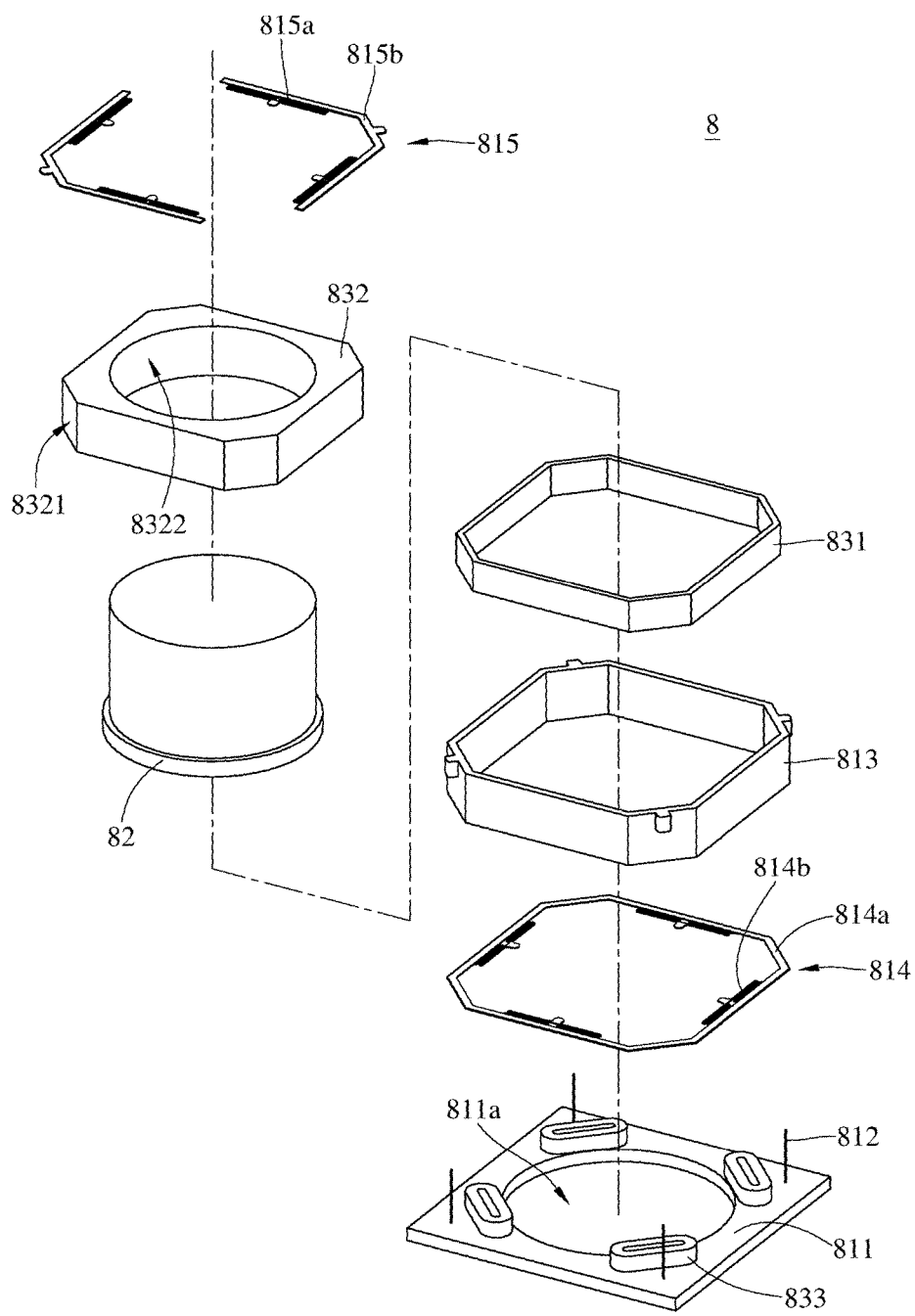
FIG. 18 is an exploded view of the lens device in FIG. 17.

Please refer to FIG. 17 to FIG. 18. FIG. 17 is a perspective view of a lens device in accordance with still yet a further embodiment of the disclosure. FIG. 18 is an exploded view in FIG. 17. In this embodiment, a lens device 8 is provided. The lens device 8 includes a connect assembly 81, a lens assembly 82 and a drive assembly 83. The connect assembly 81 includes a base plate 811, a plurality of flexible supports 812, a frame 813, a first flexible connection 814 and a plurality of second flexible connections 815. The drive assembly 83 includes a first coil 831, a magnet 832 and a plurality of second coils 833.

Figure 19:
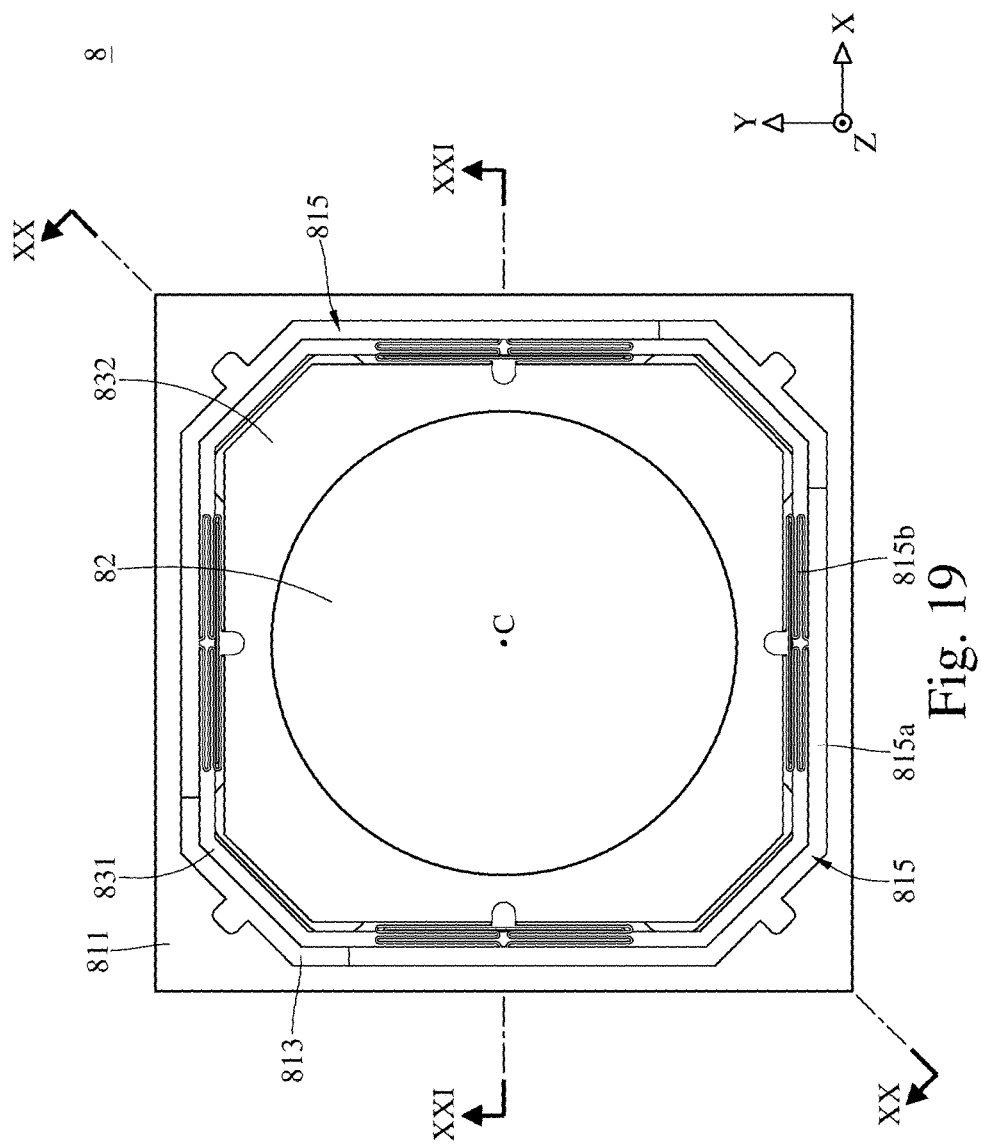
FIG. 19 is a top view of the lens device in FIG. 17.
Figure 20:
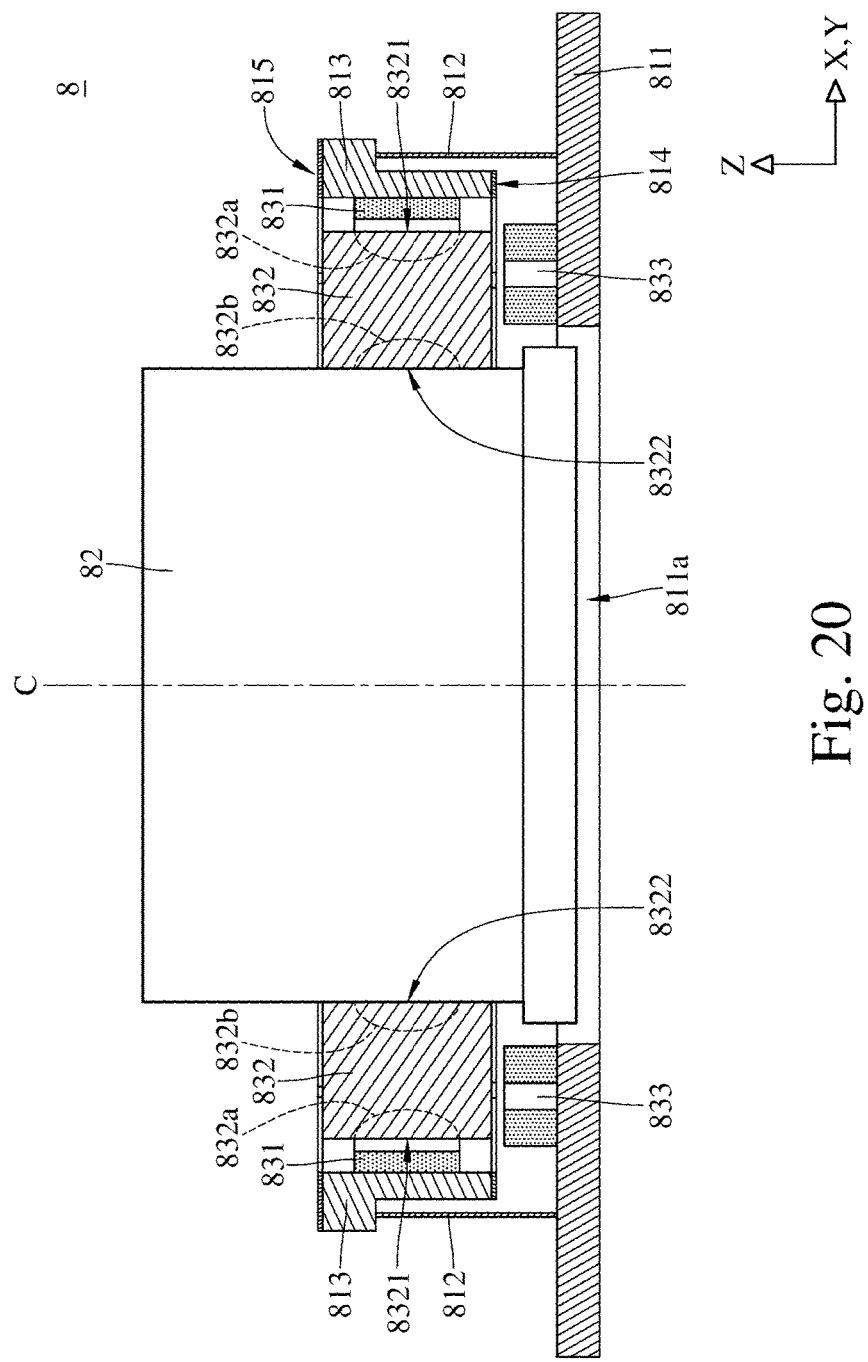
FIG. 20 is a cross-sectional view of the lens device in FIG. 19 taken along line XX-XX.
Figure 21:
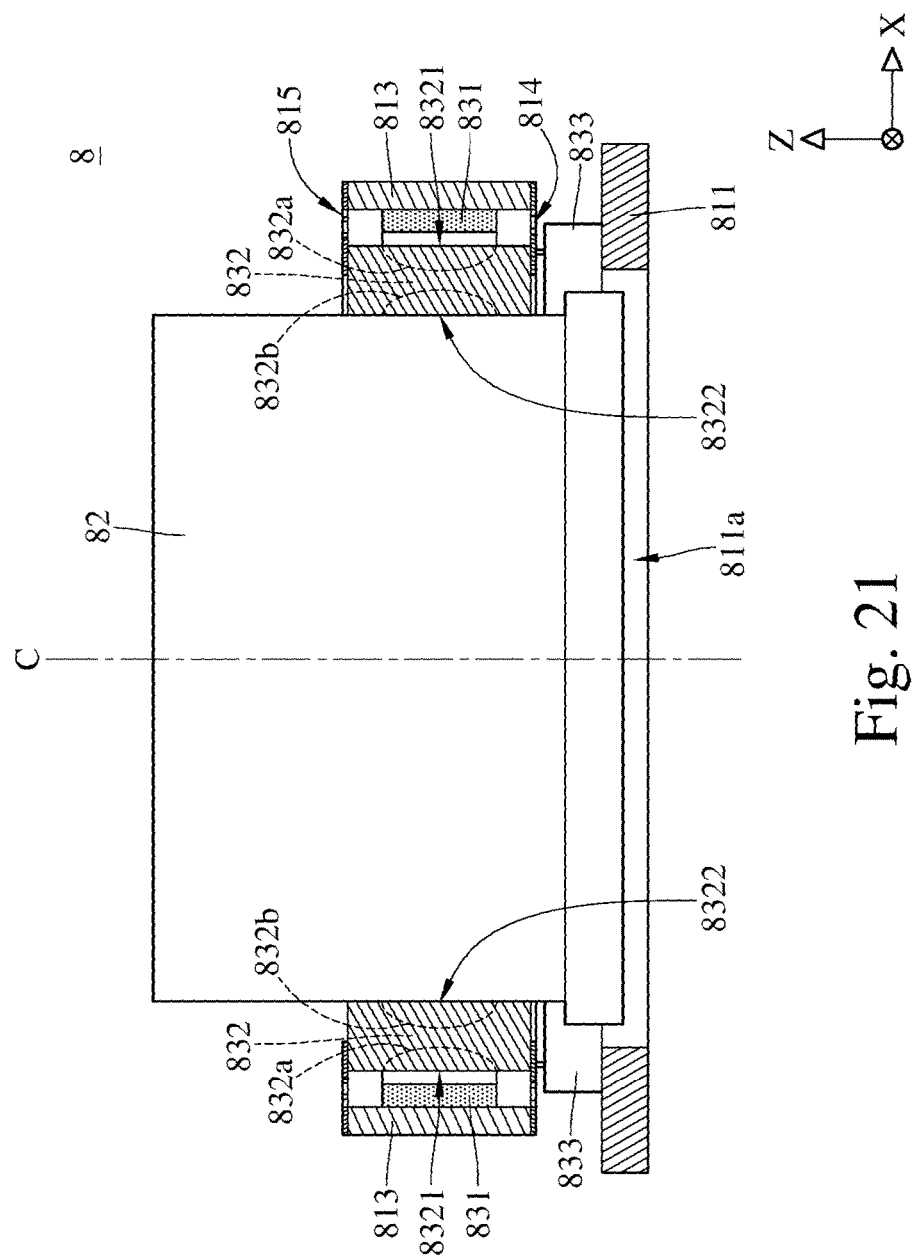
FIG. 21 is a front cross-sectional view of the lens device in FIG. 19 taken along line XXI-XXI.

Please refer to FIG. 18 to FIG. 21. FIG. 19 is a top view in FIG. 17. FIG. 20 is a cross-sectional view as taken along line XX-XX in FIG. 19. FIG. 21 is a front cross-sectional view as taken along line XXI-XXI in FIG. 19. The lens assembly 82 has a central axis C and is disposed on the magnet 832. The magnet 832 surrounds the lens assembly 82. The magnet 832 has an outer surface 8321, an inner surface 8322, a first magnetic pole 832a and a second magnetic pole 832b. The first magnetic pole 832a is located at the outer surface 8321, and the second magnetic pole 832b is located at the inner surface 8322. The first magnetic pole 832a faces away from the lens assembly 82, and the second magnetic pole 832b faces substantially toward the lens assembly 82.

The magnet 832 has a first direction of magnetic field D1 taken to be inward/outward from the first magnetic pole 832a, and has a second direction of magnetic field D2 taken to be inward/outward from the second magnetic pole 832b. The first direction of magnetic field D1 points substantially toward the central axis C or points away from the central axis C. The first direction of magnetic field D1 and the second direction of magnetic field D2 is substantially the same. The first direction of magnetic field D1 is substantially perpendicular to the central axis C. The magnet 832 is a magnetic material radially magnetized.

The frame 813 surrounds the lens assembly 82 and the magnet 832, and the frame 813 is not in contact with the lens assembly 82 and the magnet 832. The first coil 831 is disposed on an inner surface of the frame 813, and is wound around the lens assembly 82 with the central axis C taken as a winding axis. The first coil 831 is not in contact with the lens assembly 82 and the magnet 832. The first magnetic pole 832a faces toward the first coil 831. The first direction of magnetic field D1 points toward the first coil 831 or points away from the first coil 831. The first coil 831 is configured for driving the lens assembly 82 to move substantially along the central axis C by interacting with the first magnetic pole 832a. Since the magnet 832 is located between the first coil 831 and the lens assembly 82, the movement of the first coil 831, which is electric conductible, is less than the movement of the lens assembly 82 when the lens device 8 is in operation. Therefore, it is favorable for simplifying the connection to the first coil 831, thereby reducing the possibility of failure of the connection to the first coil 831.

The first flexible connection 814 is connected to a lower surface of the magnet 832 and a lower surface of the frame 813, and the second flexible connections 815 is connected to an upper surface of the magnet 832 and an upper surface of the frame 813. The first flexible connection 814 includes a first main frame 814a and a plurality of first elastic arms 814b extending radially inward from the first main frame 814a. The first main frame 814a is fixed to the lower surface of the frame 813. The first elastic arms 814b surround magnet 832 and have inward ends fixed to the lower surface of the magnet 832. The configuration of the second flexible connections 815 is similar to the configuration of the first flexible connection 814. The second flexible connection 815 has a plurality of second main frames 815*a* which form a shape similar to the shape of the first main frame 814*a*, but are separated apart from each other. In addition, the second main frames 815*a* are fixed to the upper surface of the frame 813. Furthermore, the second flexible connection 815 has a plurality of second elastic arms 815*b* which surround the magnet 832 and have inward ends fixed to the upper surface of the magnet 832.

One end of each flexible support 812 is disposed on the base plate 811 and the other end of each flexible support 812 is disposed on the frame 813. The base plate 811 has a through-hole 811*a*. Light from an object arrives at the image sensor by passing through the lens assembly 82 and the through-hole 811*a* in sequence. The flexible supports 812 surround the lens assembly 82, and support the frame 813. In this embodiment, the quantity of the flexible supports 812 is four, but the present disclosure is not limited thereto. In some embodiments, the lens device may have only one, two or more than four flexible supports. In the case that the lens device has only one flexible support, the flexible support surrounds the lens assembly 82.

The second coils 833 are disposed on the base plate 811 of the connect assembly 81. The second coils 833 are wound substantially parallel to the central axis C. An extension direction of a part of each second coil 833 in FIG. 21 is pointing into/out of the plane of the page. The second coils 833 are configured for driving the lens assembly 82, the magnet 832 and the first coil 831 to move substantially along a direction other than the central axis C by interacting with the second magnetic pole 832*b*.

Figure 22:
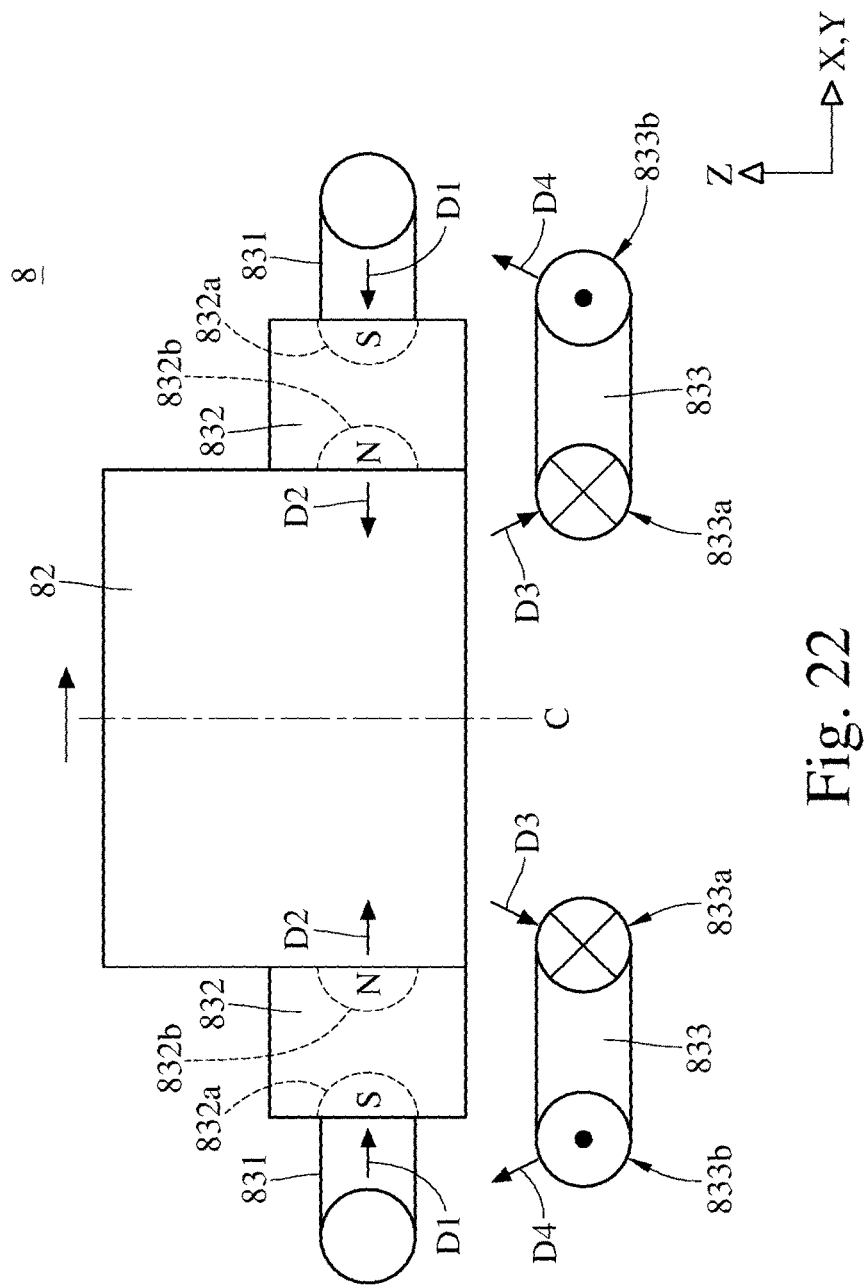
FIG. 22 is a cross-sectional view of the lens device in FIG. 20 while reducing camera shake or vibration.

Please refer to FIG. 22 a cross-sectional view of the lens device in FIG. 20 while reducing camera shake or vibration. By interacting with both the first magnetic pole 832*a* and the second magnetic pole 832*b*, the part 833*a* of the second coil 833 is experiencing a third direction of magnetic field D3, which is pointing downward and away from the central axis C, and the part 833*b* of the second coil 833 is experiencing a fourth direction of magnetic field D4, which is pointing upward and away from the central axis C.

When the lens device 8 is shaked, there has an amplitude of vibration in the XY-plane. In the meantime, an electric current passes through the second coil 833 in one direction. The direction of the electric current passing through the part 833*a* of the second coil 833 is pointing into the plane of the page, while the direction of the electric current passing through the part 833*b* of the second coil 833 is pointing out of the plane of the page. According to Right-hand rule, the part 833*a* and part 833*b* of the second coil 833 are experiencing a magnetic force toward the left-hand side of FIG. 22. However, the second coils 833 are fixed to the base plate 811, such that the second coils 833 are prevented from moving toward the left-hand side of FIG. 21, and provide a reaction force toward the right-hand side of FIG. 21 on the magnet 832. Therefore, the magnet 832 is moved toward the right-hand side of FIG. 21 as well as the lens assembly 82.

Then, when an electric current passes through the second coil 833 in an opposite direction, the direction of the electric current passing through the part 833*a* of the second coil 833 is pointing out of the plane of the page, and the direction of the electric current passes through the part 833*b* of the second coil 833 is pointing into the plane of the page. In the meantime, the part 833*a* and the part 833*b* of the second coil 833 are experiencing a magnetic force toward the right-hand side of FIG. 22, and provide a reaction force toward the left-hand side on the magnet 832. Therefore, the magnet 832 is moved toward the left-hand side of FIG. 22 as well as the lens assembly 82. The lens device 8 is able to reduce camera shake or vibration by moving the lens assembly 82 towards the direction parallel to the XY-plane. The second coils 833 can be provided with electric currents in different directions according to actual requirements, so it is favorable for adjusting the direction and the velocity of the movement of the lens assembly 82 in the XY-plane.

In addition, in another case, when the first magnetic pole 832*a* is north pole N, and the second magnetic pole 832*b* is south pole S, which are opposite to the case of FIG. 21, the lens device 8 is able to reduce camera shake or vibration by using an electric current in an opposite direction.

In other embodiment, the positions of the first coil 831 and the magnet 832 are interchangeable. In that case, the first magnetic pole 832*a* of the magnet 832 is located at the inner surface 8322, and the second magnetic pole 832*b* of the magnet 832 is located at the outer surface 8321.

Various embodiments have been described herein. It should be appreciated, moreover, that the various features of the embodiments that have been described may be interchanged and combined in various ways to produce numerous additional embodiments. These embodiments are given only by way of example and are not intended to limit the scope of the disclosure.

As the lens device as discussed in above, by the interaction between the electric current of the first coil and the magnetic field of the first magnetic pole, the lens device is able to produce a magnetic force to drive the lens assembly to move substantially along its central axis, thereby bringing the light to a focus on the image sensor. Therefore, there is no need to equip motor, gear unit and rail in the lens device of the present disclosure, so that the lens device of the present disclosure is small in size and light in weight, and is capable of adjusting focus. Also, by the interaction between the electric current of the second coil and the magnetic field of the second magnetic pole, the lens device is able to produce a magnetic force to drive the lens assembly to move substantially along a direction other than the central axis, thereby moving the lens assembly to compensate for camera shake or vibration. Thus, the camera shake or vibration is reduced.

In one embodiment, the lens device is able to respectively provide the first direction of magnetic field and the second direction of magnetic field, which are not parallel to each other, point toward the first coil and the second coil by one magnet. Thus, the amount of the magnets of the lens device of the present disclosure is less than that of the conventional lens device, so it is favorable for reducing the size and weight of the lens device.

In other embodiment, since the magnet is located between the first coil and the lens assembly, the movement of the first coil, which is electric conductible, is less than the movement of the lens assembly when the lens device is in operation. Therefore, it is favorable for simplifying the connection to the first coil, thereby reducing the possibility of failure of the connection to the first coil.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A lens device, comprising:
    a connect assembly;
    a lens assembly, disposed on the connect assembly, and the lens assembly having a central axis; and
    a drive assembly, comprising:
        a first coil wound around the lens assembly;
        at least one magnet disposed on the connect assembly, the at least one magnet having a first magnetic pole, a second magnetic pole, a first direction of magnetic field and a second direction of magnetic field, the first direction of magnetic field taken to be inward to/outward from the first magnetic pole of the magnet, the second direction of magnetic field taken to be inward to/outward from the second magnetic pole, the first direction of magnetic field and the second direction of magnetic field not parallel to each other, the first direction of magnetic field pointing toward the first coil or pointing away from the first coil, and the first coil configured for driving the lens assembly to move substantially along the central axis by interacting with the first magnetic pole; and
        at least one second coil disposed on the connect assembly, the second direction of magnetic field pointing toward a part of the at least one second coil or pointing away from the part of the at least one second coil, and the at least one second coil configured for driving the lens assembly, the at least one magnet and the first coil to move along a direction other than the central axis by interacting with the second magnetic pole.

2. The lens device according to claim 1, wherein the first coil is wound around the lens assembly with the central axis taken as a winding axis, and the at least one second coil is wound around another winding axis which is substantially parallel to the central axis.

3. The lens device according to claim 1, wherein the quantity of the at least one magnet is plural, the quantity of the at least one second coil and the quantity of the magnet are the same, the plurality of magnets surround the lens assembly, and the plurality of second coils respectively correspond to the plurality of magnets.

4. The lens device according to claim 1, wherein the quantity of the at least one magnet is one, the magnet surrounds the lens assembly, the quantity of the at least one second coil is plural, and the plurality of second coils surround the lens assembly.

5. The lens device according to claim 1, wherein the at least one magnet is disposed on the lens assembly and located between the lens assembly and the first coil, and the at least one magnet and the lens assembly are movable substantially along the central axis relative to the first coil.

6. The lens device according to claim 1, wherein the first coil is disposed on the lens assembly, a part of the first coil is located between the lens assembly and the at least one magnet, and the first coil and the lens assembly are movable substantially along the central axis relative to the at least one magnet.

7. The lens device according to claim 1, wherein the connect assembly comprises a base plate, at least one flexible support, a frame and at least one flexible connection, the at least one second coil is disposed on the base plate, the at least one flexible support is disposed on the base plate and surrounds the lens assembly, the frame surrounds the lens assembly and is supported by the at least one flexible support, the at least one flexible connection is configured for connecting the frame and the lens assembly.

8. The lens device according to claim 7, wherein the lens device further comprises a lens seat, surrounding the lens assembly and configured for connecting the lens assembly and the at least one magnet.

9. The lens device according to claim 1, wherein the second direction of magnetic field is substantially parallel to the central axis.

10. The lens device according to claim 1, wherein an extension direction of a part of the at least one second coil is substantially perpendicular to the second direction of magnetic field.

11. The lens device according to claim 1, wherein the first direction of magnetic field points substantially toward the central axis or points away from the central axis.

12. The lens device according to claim 1, wherein the first direction of magnetic field is substantially perpendicular to the central axis.

13. The lens device according to claim 1, wherein an extension direction of a part of the first coil is substantially perpendicular to the first direction of magnetic field.

14. A lens device, comprising:
    a connect assembly;
    a lens assembly, disposed on the connect assembly, and the lens assembly having a central axis; and
    a drive assembly, comprising:
        at least one first magnet, disposed on the lens assembly, the at least one first magnet having a first magnetic pole, a first direction of magnetic field taken to be inward to/outward from the first magnetic pole of the at least one first magnet;
        a first coil disposed on the connect assembly, the at least one first magnet being between the first coil and the lens assembly, the first direction of magnetic field pointing toward the first coil or pointing away from the first coil, the first coil configured for driving the lens assembly and the at least one first magnet to move substantially along the central axis by interacting with the first magnetic pole;
        at least one second magnet, disposed on the lens assembly or the first coil, the at least one second magnet having a second magnetic pole, a second direction of magnetic field taken to be inward to/outward from the second magnetic pole of the at least one second magnet, the first direction of magnetic field and the second direction of magnetic field not parallel to each other; and
        at least one second coil disposed on the connect assembly, the second direction of magnetic field pointing toward the at least one second coil or pointing away from the at least one second coil, the at least one second coil configured for driving the lens assembly, the at least one first magnet and the at least one second magnet to move along a direction other than the central axis by interacting with the second magnetic pole.

15. The lens device according to claim 14, wherein the first coil is wound around the lens assembly and the at least one first magnet with the central axis taken as a winding axis, and the at least one second coil is wound around another winding axis which is substantially parallel to the central axis.

16. The lens device according to claim 14, wherein the quantity of the at least one second magnet is plural, the quantity of the at least one second coil and the quantity of the at least one second magnet are the same, the plurality of second magnets surround the lens assembly, the plurality of second coils respectively correspond to the plurality of second magnets.

17. The lens device according to claim 14, wherein the connect assembly comprises a base plate, at least one flexible support, a frame, and at least one flexible connection, the at least one second coil is disposed on the base plate, the at least one flexible support is disposed on the base plate and surrounds the lens assembly, the frame surrounds the lens assembly, and is supported by the at least one flexible support, the first coil is disposed on the frame, the at least one first magnet and the lens assembly are movable substantially along the central axis relative to the frame and the first coil, the at least one flexible connection is configured for connecting the frame and the lens assembly.

18. The lens device according to claim 17, wherein the lens device further comprises a lens seat, surrounding the lens assembly and configured for connecting the lens assembly and the at least one first magnet.

19. The lens device according to claim 14, wherein the at least one first magnet and the at least one second magnet are magnetic materials magnetized in their thickness directions.

20. The lens device according to claim 14, wherein the second direction of magnetic field is substantially parallel to the central axis.

21. The lens device according to claim 14, wherein an extension direction of a part of the at least one second coil is substantially perpendicular to the second direction of magnetic field.

22. The lens device according to claim 14, wherein the first direction of magnetic field points substantially toward the central axis or points away from the central axis.

23. The lens device according to claim 14, wherein the first direction of magnetic field is substantially perpendicular to the central axis.

24. The lens device according to claim 14, wherein an extension direction of a part of the first coil is perpendicular to the first direction of magnetic field.

25. A lens device, comprising:
a connect assembly;
a lens assembly, disposed on the connect assembly, and the lens assembly having a central axis; and
a drive assembly, comprising:
a first coil wound around the lens assembly;
a magnet, disposed on the connect assembly, the magnet having a first magnetic pole, a second magnetic pole, a first direction of magnetic field and a second direction of magnetic field, the magnet being in a circle shape and having an inner surface and an outer surface, either the first magnetic pole or the second magnetic pole located at the inner surface, when the other one being located at the outer surface, the first direction of magnetic field taken to be inward to/outward from the first magnetic pole, the second direction of magnetic field taken to be inward to/outward from the second magnetic pole, the first direction of magnetic field and the second direction of magnetic field being substantially the same, the first direction of magnetic field pointing toward the first coil or pointing away from the first coil, and the first coil configured for driving the lens assembly to move substantially along the central axis by interacting with the first magnetic pole; and
at least one second coil disposed on the connect assembly, one side of the magnet surfaces but the inner surface or the outer surface of the magnet facing toward the at least one second coil, and the at least one second coil configured for driving the lens assembly, the magnet and the first coil to move along a direction other than the central axis by interacting with the second magnetic pole.

26. The lens device according to claim 25, wherein the first direction of magnetic field points substantially toward the central axis or pointing away from the central axis.

27. The lens device according to claim 25, wherein the first direction of magnetic field is substantially perpendicular to the central axis.

28. The lens device according to claim 25, wherein an extension direction of a part of the first coil is perpendicular to the first direction of magnetic field.

* * * * *